(12) United States Patent
Tsang

(10) Patent No.: US 9,541,899 B2
(45) Date of Patent: Jan. 10, 2017

(54) FAST GENERATION OF PURE PHASE DIGITAL HOLOGRAMS

(71) Applicant: City University of Hong Kong, Kowloon (HK)

(72) Inventor: Peter Wai Ming Tsang, Kowloon (HK)

(73) Assignee: CITY UNIVERSITY OF HONG KONG, Kowloon (HK)

(*) Notice: Subject to any disclaimer, the term of this patent is extended or adjusted under 35 U.S.C. 154(b) by 382 days.

(21) Appl. No.: 14/076,717

(22) Filed: Nov. 11, 2013

(65) Prior Publication Data

US 2015/0131133 A1 May 14, 2015

(51) Int. Cl.
*G03H 1/08* (2006.01)
*G03H 1/10* (2006.01)
(Continued)

(52) U.S. Cl.
CPC ...... *G03H 1/0808* (2013.01); *G03H 2001/085* (2013.01); *G03H 2210/30* (2013.01); *G03H 2210/441* (2013.01)

(58) Field of Classification Search
CPC ...... G03H 1/2294; G03H 1/0808; G03H 1/08; G03H 2210/30; G03H 1/02; G03H 1/0866; G03H 1/0891; G03H 2001/085; G03H 2225/55
(Continued)

(56) References Cited

U.S. PATENT DOCUMENTS 5,194,971 A 3/1993 Haines
5,483,364 A * 1/1996 Ishimoto .............. G03H 1/0808
359/15
(Continued)

FOREIGN PATENT DOCUMENTS

CN 102087503 A 6/2011
CN 102087503 B 7/2012
(Continued)

OTHER PUBLICATIONS

Tashima, et al., "Known plaintext attack on double random phase encoding using fingerprint as key and a method for avoiding the attack," Jun. 21, 2010 / vol. 18, No. 13 / Optics Express / pp. 13772-13781.
(Continued)

*Primary Examiner* — Jade R Chwasz
(74) *Attorney, Agent, or Firm* — Amin, Turocy & Watson, LLP

(57) ABSTRACT

Fast processing of information represented in digital holograms is provided to facilitate generating a phase-only hologram for displaying 3-D holographic images representative of a 3-D object scene on a display device. A holographic generator component (HGC) can receive or generate visual images, comprising depth and parallax information, of a 3-D object scene. A hologram processor component can downsample an intensity image of a visual image of the 3-D object scene using a uniform or random lattice to facilitate converting the intensity image to a sparse image. The hologram processor component can generate a complex 3-D Fresnel hologram, comprising the depth and parallax information, based on the sparse image using a fast hologram generation algorithm. The hologram processor component modify the magnitude of the pixels of the complex hologram to a defined homogeneous value to facilitate converting the complex hologram to a phase-only hologram.

14 Claims, 10 Drawing Sheets

(51) Int. Cl.
  *G02B 5/32* (2006.01)
  *G03H 1/04* (2006.01)
(58) Field of Classification Search
  USPC .......................... 359/9, 2, 15, 21, 11, 10, 35
  See application file for complete search history.

(56) References Cited

U.S. PATENT DOCUMENTS

| | | | |
|---|---|---|---|
| 5,696,601 | A | 12/1997 | Metcalfe et al. |
| 5,974,228 | A | 10/1999 | Heitsch |
| 7,088,480 | B1 | 8/2006 | Javidi et al. |
| 7,212,630 | B2 | 5/2007 | Javidi |
| 7,221,760 | B2 | 5/2007 | Javidi et al. |
| 8,150,033 | B2 | 4/2012 | Javidi et al. |
| 8,274,705 | B2 | 9/2012 | Chang |
| RE43,707 | E | 10/2012 | Kimpe et al. |
| 8,320,694 | B2 | 11/2012 | Chang |
| 8,384,973 | B2 | 2/2013 | Leister |
| 8,654,048 | B2 | 2/2014 | Collings et al. |
| 2005/0122549 | A1 | 6/2005 | Goulanian et al. |
| 2006/0001921 | A1 | 1/2006 | Bailey et al. |
| 2006/0078113 | A1 | 4/2006 | Javidi et al. |
| 2007/0024999 | A1* | 2/2007 | Crossland ............ G03H 1/0808 359/859 |
| 2007/0086662 | A1 | 4/2007 | Cho et al. |
| 2008/0218864 | A1 | 9/2008 | Javidi |
| 2009/0002787 | A1 | 1/2009 | Cable et al. |
| 2009/0207466 | A1 | 8/2009 | Bucklay |
| 2009/0219380 | A1 | 9/2009 | Cable |
| 2010/0085276 | A1 | 4/2010 | Cable |
| 2010/0149139 | A1 | 6/2010 | Kroll et al. |
| 2011/0228365 | A1 | 9/2011 | Tsang et al. |
| 2011/0261427 | A1 | 10/2011 | Hart et al. |
| 2012/0008181 | A1 | 1/2012 | Cable et al. |
| 2013/0265623 | A1 | 10/2013 | Sugiyama et al. |
| 2016/0110564 | A1 | 4/2016 | Tsang |

FOREIGN PATENT DOCUMENTS

| | | |
|---|---|---|
| CN | 103279916 A | 9/2013 |
| WO | 2005059660 A2 | 6/2005 |
| WO | 2005059881 A2 | 6/2005 |
| WO | 2006134404 A1 | 12/2006 |

OTHER PUBLICATIONS

Peng, et al. "Known-plaintext attack on optical encryption based on double random phase keys," Optics Letters / vol. 31, No. 8 / Apr. 15, 2006 / pp. 1044-1046.
Situ, et al., "Double random-phase encoding in the Fresnel domain," Optics Letters / vol. 29, No. 14 / Jul. 15, 2004 / pp. 1584-1586.
Refregier, et al. "Optical image encryption based on input plane and Fourier plane random encoding," Apr. 1, 1995 / vol. 20, No. 7 / Optics Letters / pp. 767-769.
Unnikrishnan, et al. "Optical encryption by double-random phase encoding in the fractional Fourier domain," Jun. 15, 2000 / vol. 25, No. 12 / Optics Letters / pp. 887-889.
ISO/IEC. "Information technology—Automatic identification and data capture techniques—QR Code 2005 bar code symbology specification" ISO/IEC 18004: Second Edition—Sep. 1, 2006, Retrieved on Jan. 16, 2015, 124 pages.
Ren, et al. "Secure and noise-free holographic encryption with a quick-response code," Chin. Opt. Lett. 12, Jan. 10, 2014, 4 pages.
Barrera, et al., "Optical encryption and QR codes: Secure and noise-free information retrieval," Mar. 11, 2013 /vol. 21, No. 5 / Optics Express / pp. 5373-5378.
Zhang, et al. "Vulnerability to chosen-plaintext attack of a general optical encryption model with the architecture of scrambling-then-double random phase encoding," Optics Letters / vol. 38, No. 21 / Nov. 1, 2013, pp. 4506-4509.
Frauel, et al., "Resistance of the double random phase encryption against various attacks," Aug. 6, 2007 / vol. 15, No. 16 / Optics Express /pp. 10253-10265.
Carnicer, et al. "Vulnerability to chosen-cyphertext attacks of optical encryption schemes based on double random phase keys," Optics Letters / vol. 30, No. 13 / Jul. 1, 2005 / pp. 1644-1646.
Gong, et al. "Multiple-image encryption and authentication with sparse representation by space multiplexing," Applied Optics, vol. 52, No. 31, Nov. 1, 2013, pp. 7486-7493.
Chen, et al. "Optical color image encryption based on Arnold transform and interference method", Optics Communications 282 (2009) pp. 3680-3685.
Chen, et al. "Double random phase encoding using phase reservation and compression", J. Opt. 16 (2014) 025402 (7pp).
Wikipedia. "Floyd-Steinberg Dithering" published online at [http://en.wikipedia.org/wiki/Floyd%E2%80%93Steinberg_dithering], last modified on Oct. 23, 2014, retrieved on Feb. 4, 2015, 2 pages.
Tsang, et al., "Novel method for converting digital Fresnel hologram to phase-only hologram based on bidirectional error diffusion," Optics Express, vol. 21, No. 20, Oct. 7, 2013, 7 pages.
Non-Final Office Action dated Nov. 6, 2015 for U.S. Appl. No. 14/029,144, 29 pages.
Tudela et al. "Full complex Fresnel holograms displayed on liquid crystal devices." Journal of Optics A: Pure and Applied Optics, Institute of Physics Publishing, J. Opt. A: Pure Appl. Opt. 5 (2003), Jan. 17, 2003, S1-S6.
Hsieh et al. "Improvement of the complex modulated characteristic of cascaded liquid crystal spatial light modulators by using a novel amplitude compensated technique." OE Letters, Optical Engineering, Jul. 2007/vol. 46(7), Jul. 2, 2007, 3 pages.
Makowski et al. "Complex light modulation for lensless image projection." Chinese Optics Letters, col. 9(12), 120008(2011), Dec. 10, 2011, 3 pages.
Hsueh et al. "Computer-generated double-phase holograms." Appl. Opt. 17, 3874-3883 (1978).
Reichelt et al. "Full-range, complex spatial light modulator for real-time holography." Optics Letters vol. 37, No. 11, Jun. 1, 2012, pp. 1955-1957.
Li et al. "Color holographic display using a phase-only spatial light modulator." Digital Holography and 3D Imaging, Technical Digest, Apr. 21-25, 2013, 3 pages.
Song et al. "Optimal synthesis of double-phase computer generated holograms using a phase-only spatial light modulator with grating filter." Optics Express vol. 20, No. 28, Dec. 31, 2012, 10 pages.
Liu et al. "Complex Fresnel hologram display using a single SLM," Applied Optics, vol. 50, No. 34, Dec. 1, 2011, pp. 128-135.
Weng et al. "Generation of real-time large computer generated hologram using wavefront recording method." Optics Express, vol. 20, No. 4, Feb. 13, 2012, pp. 4018-4023.
Tsang et al. "Holographic video at 40 frames per second for 4-million object points." Optics Express, vol. 19, No. 16, Aug. 1, 2011, pp. 15205-15211.
Gerchberg et al. "A Practical Algorithm for the Determination of Phase from Image and Diffraction Plane Pictures." Optik, vol. 35 (No. 2), Received Nov. 29, 1971, pp. 237-246.
Yeom et al. "Phase-only hologram generation based on integral imaging and its enhancement in depth resolution." Chinese Optics Letters, col. 9(12), Dec. 10, 2011, 4 pages.
Edward Buckley. "Holographic Laser Projection Technology." SID International Symposium Digest of Technical Papers 2008, pp. 1074-1079.
Cable et al. "Real-time Binary Hologram Generation for High-quality Video Projection Applications." SID International Symposium Digest of Technical Papers 2004, pp. 1431-1433.
Edward Buckley. "Real-Time Error Diffusion for Signal-to-Noise Ratio Improvement in a Holographic Projection System." Journal of Display Technology, vol. 7, No. 2, Feb. 2011, pp. 70-76.
"Floyd-Steinberg Dithering" retrieved from http://en.wikipedia.org/wiki/Floyd%E2%80%93Steinberg_dithering on Jan. 14, 2014, last modified Sep. 24, 2013.
Office Action for U.S. Appl. No. 14/516,332 dated Feb. 16, 2016, 54 pages.

(56) References Cited

OTHER PUBLICATIONS

Tsang et al. "Fast conversion of digital Fresnel hologram to phase-only hologram based on localized error diffusion and redistribution," Opt. Express 22, 5060-5066 (2014). Retrieved on Mar. 26, 2016, 7 pages.
Final Office Action dated Mar. 30, 2016 for U.S. Appl. No. 14/029,144, 22 pages.
Office Action dated Aug. 23, 2016 for U.S. Appl. No. 14/305,494, 112 pages.
Cathey, Jr., "Phase Holograms, Phase-Only Holograms, and Kinoforms", Dec. 1969. Retrieved on Aug. 23, 2016, 2 pages.
Falou, et al. "Segmented phase-only filter binarized with a new error diffusion approach", Journal of Optics A: Pure and Applied Optics, Feb. 11, 2005. Retrieved on Aug. 23, 2016, 10 pages.
Kiire, et al. "Three-dimensional displacement measurement for diffuse object using phase-shifting digital holography with polarization imaging camera", Optical Society of America, Dec. 1, 2011. Retrieved on Aug. 23, 2016, 6 pages.
Tsang, "Novel method for converting digital Fresnel hologram to phase-only hologram based on bidirectional error diffusion", Optics Express, Sep. 27, 2013. Retrieved on Aug. 23, 2016, 7 pages.
Knuth, "Digital Halftones by Dot Diffusion", ACM Transactions on Graphics, vol. 6, No. 4, Oct. 1987. Retrieved on Aug. 23, 2016, 29 pages.
Yagle, "Complex Numbers And Phasors", The University of Michigan, Ann Arbor, Fall 2005. Retrieved on Aug. 23, 2016, 7 pages.
Kirk, et al. "A generalisation of the error diffusion method for binary computer generated hologram design", Optics Communications 92 (1992) 12-18. Retrieved on Aug. 23, 2016, 8 pages.
Yeom, et al. "Phase-only hologram generation based on integral imaging and its enhancement in depth resolution", Chinese Optics Letters, Dec. 10, 2011. Retrieved on Aug. 23, 2016, 4 pages.
Office Action dated Sep. 19, 2016 for U.S. Appl. No. 14/516,332, 57 pages.

\* cited by examiner

FAST GENERATION OF PURE PHASE DIGITAL HOLOGRAMS

TECHNICAL FIELD

The subject disclosure relates generally to holograms, e.g., to fast generation of pure phase digital holograms.

BACKGROUND

With the advancement of computers, digital holography has become an area of interest and has gained popularity. Research findings derived from this technology can enable digital holograms to be captured optically or generated numerically, and to be displayed with holographic display devices such as a liquid crystal on silicon (LCoS) display device or a spatial light modulator (SLM) display device. Holograms generated in this manner can be in the form of numerical data that can be recorded, transmitted, and processed using digital techniques. On top of that, the availability of high capacity digital storage and wide-band communication technologies also lead to the emergence of real-time video holography, casting light on the future of, for example, a three-dimensional (3-D) television system.

A Fresnel hologram of a 3-D scene can be generated numerically by computing the fringe patterns emerged from each object point to the hologram plane. The Fresnel hologram of the 3-D scene can be used to reconstruct and display 3-D holographic images that can recreate or represent the original 3-D scene from various visual perspectives (e.g., various viewing angles).

A hologram is often considered to be the ultimate solution to 3-D display, as it can record the complex wavefront emitted from a 3-D object scene. A complex hologram can reproduce desirable (e.g., excellent quality) 3-D images that can be free from the unwanted images that can be present in other types of holograms (e.g., amplitude). A desirable scenario can be displaying the complex hologram with a single complex device, employing illumination with a coherent light source (e.g., a light-emitting diode (LED) source). However, in reality, a conventional system for displaying a complex hologram can be expensive and difficult to construct.

The above-described description is merely intended to provide a contextual overview relating to digital holograms, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

One or more embodiments, such as one or more systems, methods, computer readable storage mediums, and techniques disclosed herein, relate to processing and generating holograms. Disclosed herein is a system comprising at least one memory that stores computer-executable components, and at least one processor that facilitates execution of the computer-executable components stored in the at least one memory. The computer-executable components comprise a holographic generator component that receives or generates a visual image that represents an object scene. The computer-executable components also comprise a hologram processor component that converts the visual image to a sparse image to facilitate generating a complex hologram of the object scene based at least in part on the sparse image, and converts the complex hologram to a phase hologram to facilitate generation of a holographic image that represents the object scene based at least in part on the phase hologram, wherein the complex hologram comprises a magnitude portion and a phase portion, and the phase hologram comprises the phase portion, and wherein the sparse image has a visual characteristic that is less dense than the visual image Also disclosed herein is a method that comprises converting, by a system comprising a processing device, a visual image of an object scene to a sparse image to facilitate generating a complex hologram of the object scene based at least in part on the sparse image, wherein the complex hologram comprises a magnitude portion and a phase portion, and wherein the sparse image has a visual characteristic that is less dense than the visual image. The method also comprises converting, by the system, the complex hologram to a phase hologram to facilitate generating a holographic image that represents the object scene based at least in part on the phase hologram.

Further disclosed herein is a computer-readable storage device comprising computer-executable instructions that, in response to execution, cause a system comprising a processor to perform operations. The operations comprise modifying an intensity distribution of object points of a visual image of an object scene to a sparse intensity distribution of the object points of the visual image to facilitate generating a complex hologram of the object scene based at least in part on the sparse intensity distribution of the object points of the visual image, wherein the complex hologram comprises a magnitude portion and a phase portion, and the sparse intensity distribution of the object points of the visual image is less dense than the intensity distribution of the object points of the visual image. The operations also comprise modifying the complex hologram to a phase hologram to facilitate generating a holographic image that represents the object scene based at least in part on the phase hologram, wherein the phase hologram comprises the phase portion.

The disclosed subject matter also includes a system comprising means for downsampling an intensity distribution of object points of a visual image of an object scene to generate a downsampled intensity distribution of the object points of the visual image to facilitate generating a complex hologram of the object scene based at least in part on the downsampled intensity distribution of the object points of the visual image, wherein the complex hologram comprises a magnitude portion and a phase portion, and the downsampled intensity distribution of the object points of the visual image is less dense than the intensity distribution of the object points of the visual image. The system also comprises means for converting the complex hologram to a phase hologram to facilitate generating a holographic image that represents the object scene based at least in part on the phase hologram, wherein the phase hologram comprises the phase portion.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
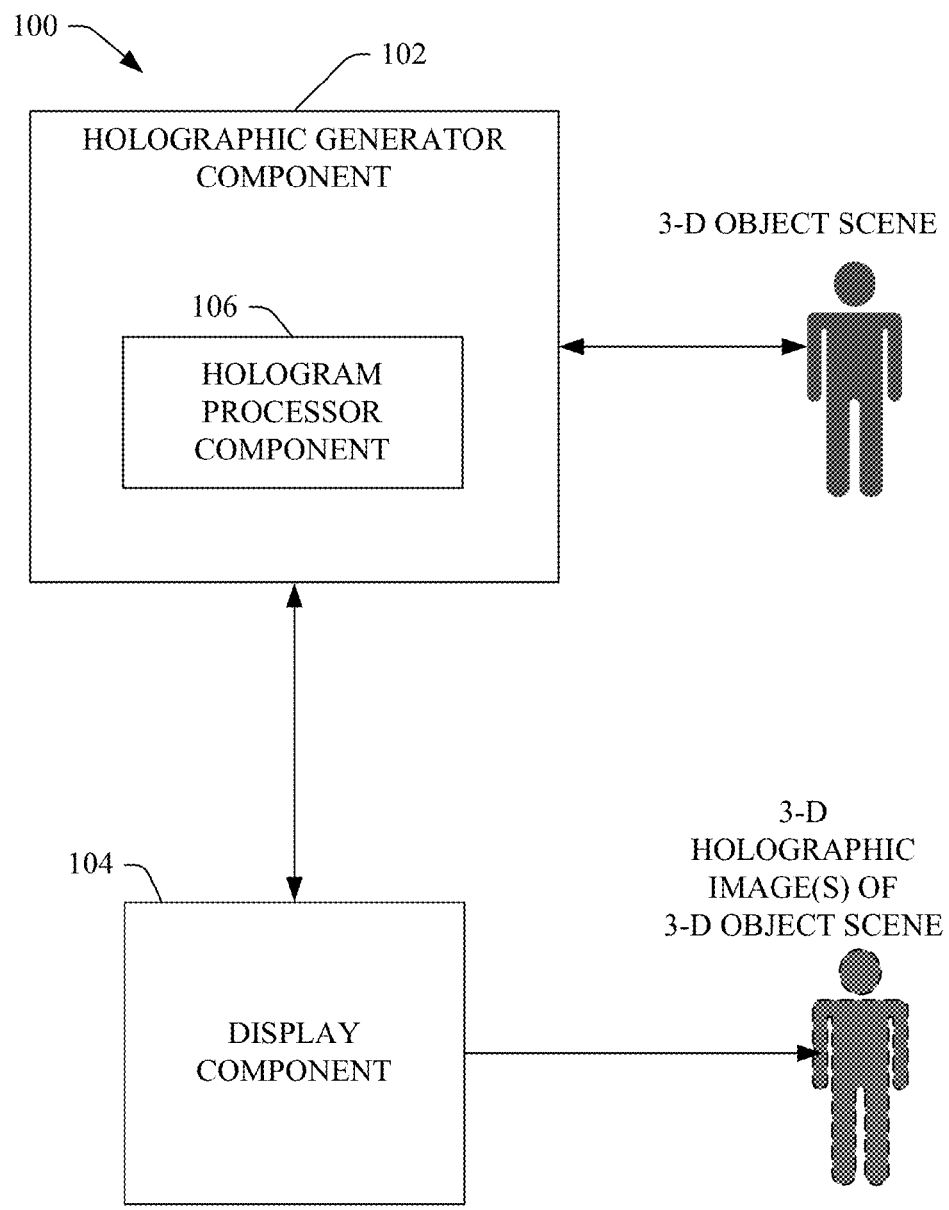
FIG. 1 illustrates a block diagram of an example system that can efficiently and quickly (e.g., in real time or at least near real time) generate a phase hologram(s) of a real or synthetic 3-D object scene(s), and display 3-D holographic images, based at least in part on the phase hologram(s), on a display component, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

In digital holography, a three-dimensional (3-D) object scene can be converted into a complex Fresnel hologram through certain numerical computations. Such a process, commonly referred to as "computer generated holography" (CGH), can be realized at video rates with fast algorithm running on commodity personal computers. Despite the encouraging development, however, the display of digital holograms remains a difficult issue.

One problem is that the pixel size of the display device that is used to display a digital hologram typically has to be close to the wavelength of visible light. With the rapid advancement of semiconductor technologies, this problem has been partially alleviated with the emergence of the high resolution spatial light modulator (SLM) (e.g. liquid crystal on silicon (LCoS)) devices. Nowadays, SLM devices with a pixel size of approximately 7 um can be purchased as off-the-shelf components at a relatively affordable price. In addition, there is an obvious trend that the resolution, as well as the size, of these display devices will be increased in the foreseeable future.

Another and more difficult problem can be that the display devices available at present can only reproduce either amplitude or phase information. In other words, these conventional display devices are incapable of displaying the complex signal of a hologram directly. If an amplitude only display is used to display the hologram, the reconstructed image will be contaminated with a de-focused twin image. While the latter can be diverted away from the virtual image by converting an inline hologram into an off-axis hologram, the angular separation between the two images can be limited by the resolution of the display. Further, the optical efficiency of an amplitude hologram can be low as the illumination beam can be attenuated by the opacity of the fringe patterns. Alternatively, a phase hologram can be generated and displayed with a phase-only display device. This can result in higher optical efficiency, and also can result in rejection of the twin image. However, the removal of the amplitude component can lead to heavy distortion on the reconstructed image.

A straightforward means to address this problem can be to employ a pair of SLMs to display a complex hologram. Alternatively, the pair of SLMs can be replaced by a single display device, displaying a pair of holograms and subsequently merging the reconstructed wavefront through a grating. These conventional approaches, though having various degrees of effectiveness, can be difficult to implement as they can have a complicated setup and can rely on precise optical alignment which can be tedious to realize in practice.

Another conventional method is to convert the complex hologram into a phase-only hologram based on the Gerberg Saxton (GS) algorithm, or the iterative Fresnel transform. Both algorithms can be capable of deriving a pure phase hologram in an iterative manner, so that its reconstructed image can match with a target planar image. On the downside, however, the phase hologram generated with such approach can be computationally intensive, and only applicable to represent a two-dimensional (2-D) image.

Still another conventional method of generating a POH developed to date, is the "One-Step Phase Retrieval (OSPR) process." Briefly, in this conventional method, a random phase can be first added to the object points prior to the generation of the digital hologram. The phase component of the hologram, which may be quantized with thresholding or error diffusion, can be displayed with a phase-only display device. The reconstructed images of the holograms generated with the OSPR process generally can be noisy and consequently multiple sub-frames, each representing the same object scene added with different random phase patterns, typically have to be presented rapidly to the observers to try to average out the speckle noise. However, these sub-frames can involve more computation to generate, and also typically have to be displayed at a relatively high frame rate to avoid the visual problem of flickering.

To that end, presented are techniques for fast (e.g., at video rate in real-time or at least near real-time) processing of information represented in digital holograms to facilitate generating a downsampled complex Fresnel hologram (e.g., a full parallax complex 3-D Fresnel hologram) that can represent an object scene (e.g., 3-D object scene), converting the complex hologram to a phase hologram (e.g., a POH, phase-specific hologram, or pure phase hologram), and displaying 3-D holographic images representative of a 3-D object scene on a display device based at least in part on the phase hologram. A holographic generator component (HGC) can receive or generate visual images (e.g., 3-D visual images), comprising depth and parallax information, of a 3-D object scene (e.g., a real or synthetic 3-D object scene). The visual images can represent the 3-D object scene from a number of different visual perspectives (e.g., from a number of different viewing angles).

In accordance with various implementations, the HGC can comprise a hologram processor component that can downsample (e.g., at video rate or faster, in real or near real time) an intensity image of a visual image of the object scene using a uniform or random lattice to facilitate converting the intensity image to a sparse image (e.g., a downsampled intensity image), as more fully disclosed herein. The hologram processor component can generate a complex Fresnel hologram, comprising the depth and parallax information, based at least in part on the sparse image using a fast hologram generation algorithm, such as more fully disclosed herein. In some implementations, the hologram processor component can generate the complex hologram of the object scene at video rate (e.g., a standard video rate or a video rate of approximately 40 frames per second or faster) in real or near real time. The complex Fresnel hologram can represent the 3-D object scene from a number of different visual perspectives (e.g., from a number of different viewing angles), which can correspond to the original visual images. The hologram processor component can modify the magnitude of the pixels of the complex hologram to a defined homogeneous value to facilitate converting the complex hologram to a phase-only hologram.

The HGC and/or a display component can facilitate generating reconstructed holographic images (e.g., full-parallax 3-D holographic images), comprising the depth and parallax information, of the object scene based at least in part on the phase-only hologram. The display component, which can comprise, for example, a display device, can display the reconstructed holographic images for viewing (e.g., 3-D viewing) by observers, wherein the reconstructed holographic images can represent the 3-D object scene from a number of different visual perspectives (e.g., from a number of different viewing angles), which can correspond to the original visual images. In accordance with various implementations, the display device can be an SLM or an LCoS display device that can be used to facilitate displaying 3-D holographic images (e.g., full-parallax 3-D holographic images) that can be reconstructed using the phase hologram. In some implementations, the display device can be a phase-only or phase-specific display device (e.g., phase-only SLM display device) that can facilitate displaying phase-only or phase-specific holographic images generated using a phase hologram.

As more fully disclosed herein, the reconstructed holographic images generated from the phase holograms, in accordance with the disclosed subject matter, can exhibit favorable visual quality, as compared with reconstructed holographic images obtained using conventional holographic generation techniques. Also, in contrast to some conventional methods or techniques, which can add or generate noise in reconstructed images of the original 3-D object scene, the disclosed subject matter can facilitate generating holograms and reconstructing holographic images that do not involve adding noise to the original 3-D scene, such as more fully disclosed herein. Further, in contrast to conventional methods or techniques, no further processing (e.g., no further hologram generation processing, such as, for example, quantization or other type of hologram generation processing) is necessary after the hologram is generated, as the recorded 3-D holographic image can be reconstructed by illuminating the phase hologram (e.g., POH, phase-specific hologram, or pure phase hologram) via an SLM device using a coherent beam of light. In other implementations, the phase hologram also can be displayed using a static media (e.g., a single static media), such as a photographic film or a printout, comprising information relating to the phase hologram.

Turning to FIG. 1, illustrated is a block diagram of an example system 100 that can efficiently and quickly (e.g., in real time or at least near real time) generate a phase hologram(s) (e.g., a full-parallax 3-D phase-only hologram(s)) of a real or synthetic 3-D object scene(s), and display 3-D holographic images, based at least in part on the phase hologram(s), on a display component (e.g., a phase-only or phase-specific display component), in accordance with various aspects and embodiments of the disclosed subject matter. In an aspect, the system 100 can include a holographic generator component (HGC) 102 that can desirably generate a complex hologram, based at least in part on a downsampled visual image (e.g., 3-D visual image) of the 3-D object scene, as more fully disclosed herein, wherein the complex hologram can represent the 3-D object scene (e.g., real or computer-synthesized 3-D object scene) from multiple different viewing perspectives that can correspond to multiple different viewing perspectives of the visual image and correspondingly the original 3-D object scene. A complex hologram (e.g., a complex amplitude hologram) is a hologram that can comprise a magnitude component or portion (e.g., an amplitude magnitude component or portion), which can have a magnitude value, and a phase component or portion, which can have a phase value. As more fully disclosed herein, the HGC 102 can convert the complex hologram to a phase hologram (e.g., a phase-only hologram (POH), phase-specific hologram, or pure phase hologram), wherein the phase hologram can be used to generate, reconstruct, or reproduce 3-D holographic images for display to one or more viewers, and wherein the 3-D holographic images can represent or recreate the original 3-D object scene from multiple visual perspectives.

In some embodiments, the HGC 102 and/or other components (e.g., display component 104) of the system 100 can be part of a multiple-view aerial holographic projection system (MVAHPS) that can generate and display a 3-D holographic image(s) of a 3-D real or synthetic, static or animated, object scene viewable from multiple perspectives (e.g., multiple angles in relation to the 3-D object scene), wherein the 3-D holographic image(s) can be viewed, for example, as a 3-D image(s) floating in mid-air in a desired display area (e.g., 3-D chamber) associated with the display component 104. The HGC 102 and display component 104 (e.g., a SLM or LCoS display device, which can be a phase-only or phase-specific display device) can facilitate generating and displaying holograms (e.g., phase holograms) that can represent the object scene at video rate in real time or near real time and displaying, for example, 2048×2048 pixel holographic images (e.g., full-parallax 3-D holographic images), each of which can represent 4 million object points, at approximately 40 frames per second or faster in real time or near real time).

The HGC 102 can receive (e.g., obtain) visual images of a real 3-D object scene (e.g., captured 3-D object scene), or can generate or receive visual images of a synthetic 3-D object scene (e.g., computer generated 3-D object scene). In some implementations, the HGC 102 can generate or receive visual images of a computer generated 3-D object scene that can be realized (e.g., generated) using numerical means without the presence of a physical or real-world 3-D object scene.

The HGC 102 can comprise a hologram processor component 106 that can be employed to facilitate efficiently and quickly (e.g., at video rate or faster, in real or near real time) generating phase holograms that can represent the original object scene from various visual perspectives to facilitate displaying holographic images by the display component 104 based at least in part on the phase holograms. To facilitate efficiently, generating, converting, and displaying phase holograms of desirable quality, the hologram processor component 106 can quickly (e.g., at video rate or a faster rate, in real-time or at least near real-time) process information represented in digital holograms to facilitate converting or downsampling visual images of an object scene to generate sparse images, generating complex holograms based at least in part on the sparse images, converting the complex holograms (e.g., complex full-parallax 3-D digital Fresnel holograms) to phase holograms (e.g., a POHs, phase-specific holograms, or pure phase holograms), reconstructing 3-D holographic images representative of a 3-D object scene based at least in part on the phase holograms, and displaying the 3-D holographic images on one or more display screens of the display component 104.

In accordance with various implementations, the hologram processor component 106 can downsample (e.g., at video rate or faster, in real or near real time) the visual images of an object scene by a defined downsampling factor (e.g., a factor of more than 1, wherein the factor can be a desired real or integer number) using a uniform or random lattice (e.g., downsampling lattice) to facilitate generating sparse or downsampled images that can have a visual characteristic (e.g., intensity distribution of object points of a visual image) that can be less dense than the visual characteristic of the original visual images. For instance, the hologram processor component 106 can downsample the intensity distribution (e.g., intensity image, intensity profile) of object points of the visual image using a uniform grid-cross lattice having a desired downsampling factor to facilitate converting (e.g., changing, adjusting, modifying, adapting, transforming) the intensity distribution of the object points of the image to the sparse (e.g., downsampled) intensity distribution of object points of the image. In other implementations, the hologram processor component 106, using stochastic downsampling, can downsample an intensity distribution of the object points of the visual image using a downsampling lattice (e.g., a non-uniform or random downsampling lattice) with a desired downsampling factor to facilitate converting the intensity distribution of the object points of the image to the sparse intensity distribution of object points of the image. The sparse intensity distribution can be more sparse (e.g., less dense) than the original intensity distribution of the object points of the image of the object scene, wherein the sparseness of the sparse intensity distribution of the object points of the image relative to the original intensity distribution of the object points of the image can be based at least in part on the downsampling factor. The sparse image associated with the sparse intensity distribution of object points of the image of the object scene can comprise the parallax information (e.g., vertical and horizontal parallax information) and depth information associated with the visual image and original object scene.

For respective visual images of the object scene, the hologram processor component 106 can generate a complex hologram based at least in part on the sparse image (e.g., the sparse intensity distribution of object points of the visual image), including the parallax information and the depth information of the sparse image, for example, using a fast hologram generation algorithm, such as disclosed herein. The generated hologram can be a full-parallax 3-D Fresnel hologram, comprising parallax information (e.g., vertical parallax information and horizontal parallax information) and depth information, that can represent or correspond to the 3-D visual image, and can represent, correspond to, or recreate the original 3-D object scene, from multiple visual perspectives (e.g., multiple viewing angles).

In some implementations, the hologram processor component 106 can generate model data that can represent the 3-D object scene from a desired number of viewing perspectives, based at least in part on the sparse image (e.g., the sparse intensity distribution of object points of the visual image) and/or received or generated information regarding the original 3-D object scene from multiple visual perspectives. The HGC 102 also can convert the model data to generate digital holographic data for the 3-D hologram that can be used to facilitate generating and displaying 3-D holographic images that can represent or recreate the original 3-D object scene from multiple visual perspectives.

The hologram processor component 106 can employ any of a variety of techniques or processes to facilitate generating complex 3-D holograms of a 3-D object scene, based at least in part on the sparse image (e.g., the sparse intensity distribution of object points of the visual image), at video rate (e.g., approximately 30 frames per second) or faster or in real or near real time. For instance, in some implementations, the hologram processor component 106 can generate holograms, such as digital mask programmable holograms (DMPHs) that can be complex holograms that can be different from the classical digital Fresnel holograms. A DMPH can mimic a high-resolution hologram, but also can be displayed using display devices that can have considerably lower resolution. The hologram processor component 106 can produce a DMPH by the superposition of two images. For instance, the hologram processor component 106 can produce a DMPH that can comprise a static, high-resolution grating (e.g., a static high-resolution image) and a lower-resolution mask (e.g., a lower-resolution image), wherein the lower-resolution mask can be overlaid onto or superpositioned with the high-resolution grating. The hologram processor component 106 can generate a DMPH such that the reconstructed holographic image of the DMPH can be programmed to approximate a target image (e.g., planar target image), including both intensity and depth information, by configuring the pattern of the mask. Employing such fast hologram techniques relating to DMPHs, the hologram processor component 106 can facilitate generating complex holograms at video rate in real or near time (e.g., facilitate generating and displaying, for example, a 2048×2048 pixel hologram, which can represent 4 million object points, at 40 frames per second or faster in real or near real time).

In certain implementations, the hologram processor component 106 can facilitate quickly generating (e.g., at video rate of faster, in real or near real time) complex holograms in part, for example, by downsampling information representing an object scene (e.g., information of the sparse image of the object scene) by a defined downsampling factor, generating an intermediate object wavefront recording plane (WRP) or an interpolative wavefront recording plane (IWRP) for a 3-D image of a 3-D object scene and/or using a look-up table(s) to store wavefront patterns of square regions of the 3-D image, and further processing (e.g., expanding, interpolating, etc.) the WRP or IWRP to facilitate generating holographic images that can represent the original object scene. Employing such fast hologram generation techniques or processes, the hologram processor component 106 can facilitate generating a complex hologram (e.g., a 2048×2048 pixel complex hologram, which can represent 4 million object points) at 40 frames per second or better. The hologram processor component 106 can efficiently generate complex full-parallax 3-D Fresnel holograms that can represent less than 4 million object points, 4 million object points, or more than 4 million object points, at less than 40 frames per second, 40 frames per second, or more than 40 frames per second. The fast hologram generation techniques or processes, as disclosed herein, are merely a few of a number of fast hologram generation techniques or processes that can be employed to facilitate generating a complex hologram (e.g., a 2048×2048 pixel hologram, which can represent 4 million object points) at 40 frames per second or faster in real or near real time.

The hologram processor component 106 also can facilitate converting (e.g., at video rate of faster, in real or near real time) complex holograms of an object scene to phase holograms that can represent the object scene (e.g., from various visual perspectives that correspond to the various visual perspectives of the object scene contained in the original visual images of the object scene). A complex hologram can comprise a magnitude portion (or amplitude portion) and a phase portion. That is, each member (e.g., pixel) of a complex hologram can have a magnitude value and a phase value (e.g., corresponding to the phase angle for the member). To facilitate converting a complex hologram to a phase hologram, the hologram processor component 106 can set or modify the magnitude of each member of a complex hologram to a defined magnitude value, which can be a constant or homogeneous value (e.g., a value of unity), to facilitate removing the magnitude portion of each member of the complex hologram. The hologram processor component 106 also can preserve or maintain the respective phase values of respective members of the complex hologram to facilitate generating the phase hologram. The phase hologram can comprise respective members that have the same defined magnitude value, while having respective phase values that are the same as the respective phase values of the respective members of the complex hologram. The phase hologram can comprise the parallax information (e.g., vertical parallax information and horizontal parallax information) and depth information, that can represent or correspond to the 3-D visual image and corresponding complex hologram.

The HGC 102 and/or display component 104 can facilitate generating a reconstructed holographic image(s) based at least in part on the phase hologram of the object scene. For instance, the HGC 102 and/or display component 104 can facilitate applying a coherent optical beam to the phase hologram to facilitate generating a reconstructed holographic image(s) that can represent the 3-D object scene associated with the original complex hologram. As illustrated in the disclosed subject matter, the reconstructed holographic images, generated based at least in part on the phase hologram, can have more favorable visual quality and can be generated more efficiently, as compared to reconstructed holographic images obtained from phase holograms using conventional techniques.

With further regard to the display component 104, the display component 104 can be electronically accessible. The HGC 102 can be associated with (e.g., communicatively connected to) the display component 104 and can provide (e.g., communicate) the 3-D hologram (e.g., the 3-D phase hologram) to the display component 104, for example, at video rate or a faster rate in real or near real time. In some implementations, the 3-D phase hologram can be on recorded media (e.g., 2-D media, such as film), and the HGC 102 can provide the 3-D phase hologram via the recorded media, as disclosed herein.

The display component 104 can facilitate generating, reconstructing, reproducing, or presenting 3-D holographic images (e.g., full-parallax 3-D Fresnel holographic images, comprising 3-D depth information, and 3-D vertical and horizontal parallax information) that can represent or recreate the original 3-D object scene, based at least in part on the phase hologram(s), and can present (e.g., display) the 3-D holographic images for viewing by one or more viewers from various visual perspectives of the original 3-D object scene. In some implementations, the HGC 102 and the display component 104 can operate in conjunction with each other to facilitate generating, reconstructing, reproducing, or presenting the 3-D holographic images that can represent or recreate the original 3-D object scene, based at least in part on the phase hologram(s), for presentation, by the display component 104. The display component 104 can be or can comprise a display device(s), such as an SLM display device or an LCoS display device that can be used to facilitate displaying 3-D holographic images (e.g., full-parallax 3-D holographic images) that can be reconstructed using the phase hologram. In some implementations, the display component 104 can be or can comprise a phase-only or phase-specific display device(s) (e.g., phase-only SLM display device).

In some implementations, the display component 104 can include one or more display units (e.g., one or more electronically accessible display units, wherein each pixel of a display unit(s) can be electronically accessible), wherein each display unit can be a phase-only display device, such as a phase-only SLM display device or a phase-only LCoS display device. In other implementations, the display component 104 can comprise one or more of high-resolution LCDs, autostereoscopic display devices (e.g., multiple-section autostereoscopic displays (MSADs)), holographic 3-D television (TV) displays, high-resolution LCoS display devices, high-resolution SLM display devices, or other desired display devices suitable for displaying holographic images (e.g., 3-D Fresnel holographic images produced from phase holograms), to facilitate displaying (e.g., real time displaying) of holographic images.

Additionally and/or alternatively, if desired, a hologram can be produced (e.g., by the HGC 102 or another component) onto a desired material (e.g., onto film using photographic techniques) so that there can be a hard copy of the hologram that can be used to reproduce the 3-D holographic images at a desired time. In some implementations, the HGC 102 can generate the digital hologram (e.g., the 3-D phase hologram) using a single static media, such as a photographic film or a printout, comprising information relating to the digital hologram. The display component 104 can display holographic images that can be reconstructed based at least in part on the digital hologram of the static media.

It is to be appreciated and understood that the holographic output (e.g., 3-D hologram and/or corresponding 3-D holographic images) can be communicated over wired or wireless communication channels to the display component 104 or other display components (e.g., remote display components, such as a 3-D TV display) to facilitate generation (e.g., reconstruction, reproduction) and display of the 3-D holographic images of the 3-D object scene so that the 3-D holographic images can be presented to desired observers.

The system 100 and/or other systems, methods, devices, processes, techniques, etc., of the disclosed subject matter can be employed in any of a number of different applications. Such applications can include, for example, a 3-D holographic video system, desktop ornaments, attractions in theme parks, educational applications or purposes, a holographic studio, scientific research, live stage or concerts, etc.

Further aspects and embodiments of the disclosed subject matter are described herein with regard to FIG. 1 and the other figures disclosed herein. Consider a discrete 3-D object comprising a collection of object points. The intensity distribution of the object points can be represented by I(U,V). A complex Fresnel hologram parallel to the image, and located at certain distance from the hologram, can be generated according to Equation (1) as follows:

$$H(x, y)\Big|_{\substack{0 \leq x < X \\ 0 \leq y < Y}} = \sum_{u=0}^{X-1} \sum_{v=0}^{Y-1} \frac{I(u, v)\exp(i2\pi r_{u;v;x;y}/\lambda)}{r_{u;v;x;y}}, \quad (1)$$

where I(U,V) and $r_{u;v;x;y} = \sqrt{((x-u)^2\delta + (i-v)^2\delta + w_{u;v}^2)}$ can be the intensity of the point located at (u, v) in the 3-D object scene and that point's distance to the hologram, respectively; the perpendicular distance of a point at position (u, v) to the hologram can be denoted by $w_{u;v}$; $\lambda$ can be the wavelength of the optical beam; $\delta$ can be the pixel size of the hologram; and X and Y can be the number of rows and columns of the hologram, and without loss of generality, can be assumed to be the same as the object scene.

The hologram can be directly converted to a phase-only hologram $H_p(x, y)$ by setting the magnitude of each pixel to unity, and preserving the phase value intact, e.g., in accordance with Equation (2) as follows:

$$|H_p(x,y)|=1, \text{ and } \arg(H_p(x,y))=\arg(H(x,y)) \quad (2)$$

However, the downside of this straightforward approach can be that the reconstructed image of the phase-only hologram $H_p(x, y)$ can be heavily distorted as compare to the original 3-D image.

The disclosed subject matter describes various systems, methods, and techniques to overcome the problems, including the problem described above, with using conventional methods for generating and reconstructing holograms. In some implementations, the hologram processor component 106 can increase the sparseness of an object scene through suitably downsampling the intensity distribution I(u,v) of object points of a visual image to a sparse form (e.g., a sparse intensity distribution $I_D(u,v)$ of object points of the visual image) prior to generating a hologram representing the visual image. As such, for instance, the complex hologram can be generated in accordance with Equation (3) as follows:

$$H(x, y)\Big|_{\substack{0 \leq x < X \\ 0 \leq y < Y}} = \sum_{u=0}^{X-1} \sum_{v=0}^{Y-1} \frac{I_D(u, v)\exp(i2\pi r_{u;v;x;y}/\lambda)}{r_{u;v;x;y}}, \quad (3)$$

and the hologram processor component 106 can apply (e.g., perform calculations using) Equation (2) to facilitate converting the complex hologram, which can be based at least in part on the sparse intensity distribution $I_D(u,v)$ of object points of the visual image, into a phase-only hologram. The hologram processor component 106 can employ various processes and techniques to facilitate converting the intensity distribution I(u,v) of the object points of the visual image to a sparse intensity distribution $I_D(u,v)$ of object points of the visual image, as more fully disclosed herein.

In some implementations, the hologram processor component 106 can convert the intensity profile I(u,v) (e.g., intensity distribution) of object points of a visual image into a texture of horizontal, vertical, and diagonal lines by downsampling the intensity profile I(u,v) with a uniform grid-cross lattice. With the downsampled image (e.g., the downsampled intensity distribution of the object points of the image) being denoted by $I_D(u,v)$, the hologram processor component 106 can determine or generate the downsampled image in accordance with Equation (4) as follows:

$$I_D(u,v)=I_1(u,v) \cup I_2(u,v) \cup I_3(u,v) \cup I_4(u,v). \quad (4)$$

In certain implementations, the hologram processor component 106 can determine, calculate, or derive the first pair of components (e.g., first pair of intensity distribution components), $I_1(u,v)$ and $I_2(u,v)$, which can lead to the vertical and horizontal lines, using, for example, Equations (5) and (6) as follows:

$$I_1(u, v) = \begin{cases} I(u, v) & u = \tau M \\ 0 & \text{otherwise} \end{cases}, \quad (5)$$

$$\text{and } I_2(u, v) = \begin{cases} I(u, v) & u = \tau M \\ 0 & \text{otherwise} \end{cases}. \quad (6)$$

The hologram processor component 106 can determine, calculate, or derive the second pair of components (e.g., second pair of intensity distribution components), $I_3(u,v)$ and $I_4(u,v)$, which can contribute to the diagonal lines, by sub-sampling the intensity distribution I(u,v) of the object points of the visual image with a cross lattice in accordance with Equations (7) and (8) as follows:

$$I_3(u, v) = \begin{cases} I(u, v) & (u \bmod M) = (v \bmod M) \\ 0 & \text{otherwise} \end{cases}, \quad (7)$$

-continued $$\text{and } I_4(u, v) = \begin{cases} I(u, v) & (u \bmod M) = [(M-1) - (v \bmod M)] \\ 0 & \text{otherwise} \end{cases} \quad (8)$$

wherein mod can be the modulo operator, and the term M can be the sub-sampling factor which can govern the sparseness of the downsampled image $I_D(u,v)$ (e.g., the downsampled intensity distribution of the object points of the image).

In other implementations, as an alternative to converting the intensity profile I(u,v) (e.g., intensity distribution) of object points of a visual image into a texture of horizontal, vertical, and diagonal lines by downsampling the intensity profile I(u,v) with a uniform grid-cross lattice, the hologram processor component 106 instead can employ stochastic downsampling to facilitate converting the intensity distribution I(u,v) of the object points of the image into a sparse form. For instance, the hologram processor component 106 can perform stochastic downsampling on the intensity distribution I(u,v) of the object points of the visual image to facilitate converting the intensity distribution I(u,v) of the object points of the image into a sparse intensity distribution $I_D(u,v)$ of object points of the visual image. Mathematically, for instance, the hologram processor component 106 can employ this stochastic downsampling process by multiplying the intensity distribution I(u,v) of the object points of the image with a downsampling lattice G(u,v), wherein the downsampling lattice G(u,v) can be given by Equation (9) as follows:

$$G(u, v) = \begin{cases} 1 \text{ (sample point)} & \tau > k \\ 0 & \text{otherwise} \end{cases}, \quad (9)$$

wherein $\tau$ can be a random value and k can be a constant value, and wherein the values of both $\tau$ and k can be in the range of [0,1]. The hologram processor component 106 can determine, calculate, or derive the downsampled intensity distribution $I_D(u,v)$ of the object points of the image as the product of the intensity distribution I(u,v) of the object points of the image with the downsampling lattice G(u,v), in accordance with Equation (10) as follows:

$$I_D(x,y) = I(u,v)G(u,v). \quad (10)$$

The hologram processor component 106 can generate (e.g., at video rate or faster, in real or near real time) a complex hologram that can represent the visual image (e.g., using Equation (3)) based at least in part on the downsampled visual image (e.g., the downsampled intensity distribution $I_D(u,v)$ of the object points of the image), for example, using one of the fast hologram generation algorithms, such as disclosed herein. The hologram processor component 106 also can convert the complex hologram to a phase hologram (e.g., a POH, phase-specific hologram, or pure phase hologram), for example, by applying Equation (2), as disclosed herein.

Figure 2:
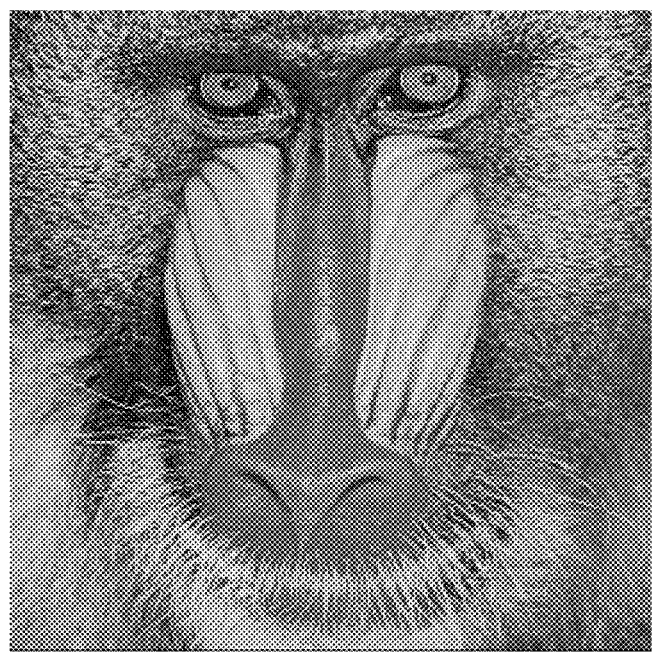
FIG. 2 depicts an example planar test image.

Experimental evaluation of the various techniques of the disclosed subject matter demonstrate that the disclosed subject matter can produce favorable results in quickly and efficiently generating good-quality phase holograms, as compared to phase-only holograms generated using conventional techniques. FIG. 2 depicts a planar test image 200 (e.g., "Baboon" image) that can be employed to facilitate demonstrating various aspects of the disclosed subject matter. Equation (1) is applied to generate the complex Fresnel hologram of the planar test image 200 (e.g., "Baboon" image). The hologram, as well as the test image 200, each comprise 2048×2048 pixels, each having a square size of 7 µm×7 µm. The wavelength of the optical beam is 650 nanometers (650 nm). The test image 200 is parallel to, and located at 0.3 meters (m) from, the hologram plane. The numerical reconstructed image of the complex hologram is visually identical to the original image, and hence is not presented here.

Figure 3:
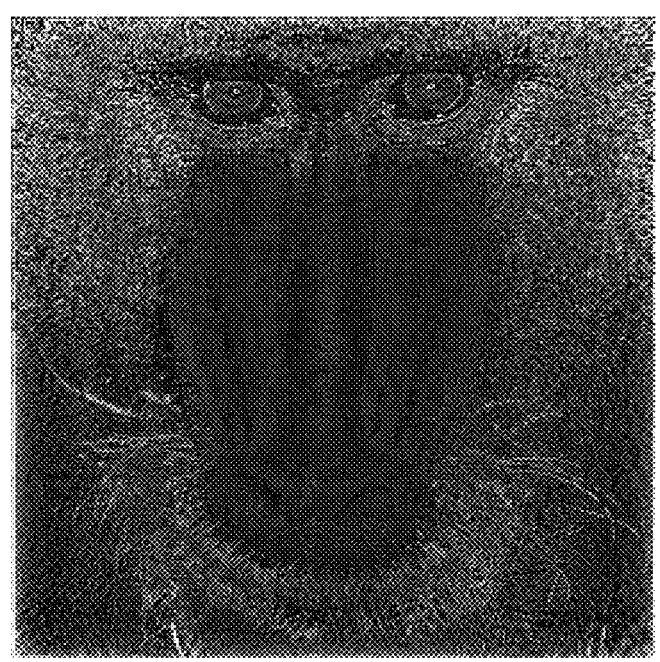
FIG. 3 presents an example numerical reconstructed image obtained using a phase-only hologram obtained using a conventional process.

Next, as part of the conventional process, a phase-only hologram is derived by simply removing the magnitude component of the complex hologram using Equation (2). FIG. 3 presents an example numerical reconstructed image 300 obtained using this phase-only hologram obtained using a conventional process. In the numerical reconstructed image 300, it can be observed that the reconstructed image 300 is of undesirable quality, as the shaded regions of the reconstructed image 300 are removed extensively, leaving behind mostly the edges of the image.

Figure 4:
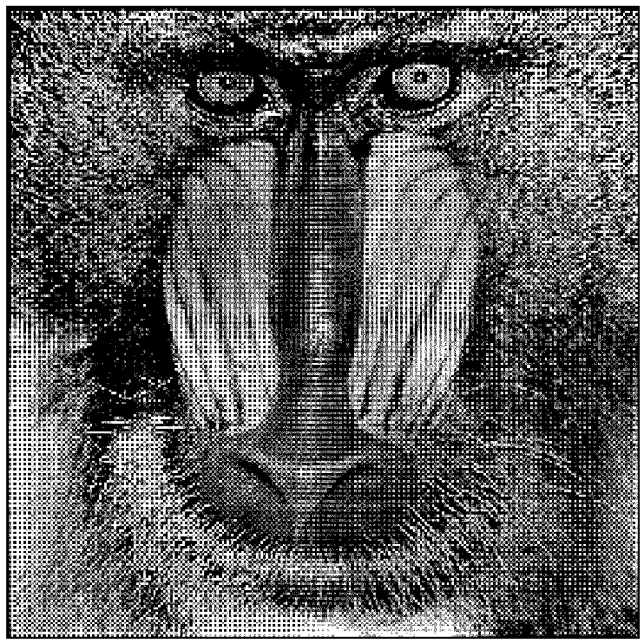
FIG. 4 presents an example reconstructed image, based on the test image, that is obtained by using a downsampling process, comprising downsampling an intensity distribution of object points of an image using a uniform grid-cross lattice, to facilitate generating a phase-only hologram, in accordance with various aspects and embodiments of the disclosed subject matter.

To overcome this and other problems, the disclosed subject matter can apply a downsampling process (e.g., downsampling an intensity distribution I(u,v) of object points of an image using a uniform grid-cross lattice) to facilitate generating a phase-only hologram that can be of higher quality than conventional techniques. FIG. 4 presents an example reconstructed image 400 of a phase-only hologram, based on the test image 200, that is obtained by using a downsampling process, comprising downsampling an intensity distribution I(u,v) of object points of an image using a uniform grid-cross lattice, to facilitate generating the phase-only hologram, in accordance with various aspects and embodiments of the disclosed subject matter. To facilitate generating the reconstructed image 400, the intensity distribution of the test image (which is the same as the planar image in this case), is downsampled using Equations (4) through (8). Equation (1) is then applied to the downsampled intensity distribution of the test image to facilitate generating the complex hologram, and the complex hologram is converted into a phase-only hologram using Equation (2). As can be observed in the reconstructed image 400, the visual quality of the reconstructed image 400 is favorable. However, it is noted that the reconstructed image 400 also carries a relatively slight impression of the regular downsampling lattice.

Figure 5:
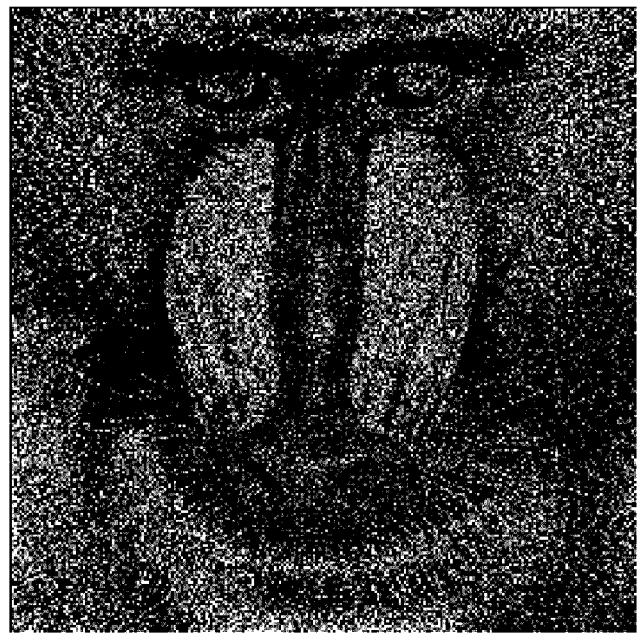
FIG. 5 presents an example reconstructed image, based on the test image, that is obtained by using a downsampling process, comprising downsampling an intensity distribution of object points of an image using stochastic downsampling, to facilitate generating a phase-only hologram, in accordance with various aspects and embodiments of the disclosed subject matter.

In other implementations, the disclosed subject matter can apply a downsampling process (e.g., downsampling an intensity distribution I(u,v) of object points of an image using a stochastic downsampling process) to facilitate generating a phase-only hologram that can be of higher quality than conventional techniques. FIG. 5 presents an example reconstructed image 500 of a phase-only hologram, based on the test image 200, that is obtained by using a downsampling process, comprising downsampling an intensity distribution I(u,v) of object points of an image using stochastic downsampling and a random lattice, to facilitate generating the phase-only hologram, in accordance with various aspects and embodiments of the disclosed subject matter. To facilitate generating the reconstructed image 500, the intensity distribution of the test image (which is the same as the planar image in this case), is downsampled using Equations (9) and (10). Equation (1) is then applied to the downsampled intensity distribution of the test image to facilitate generating the complex hologram, and the complex hologram is converted into a phase-only hologram using Equation (2). As can be observed in the reconstructed image 500, the visual quality of the reconstructed image 400 also is favorable, as it is free from the appearance of the regular downsampling pattern, although it is noted that the reconstructed image 500 is a bit more noisy than the test image 200 and reconstructed image 400.

The disclosed subject matter can have a number of aspects relative to conventional systems, methods, and techniques for hologram processing and generation. For instance, the disclosed subject matter (e.g., employing the hologram processor component and the techniques disclosed herein) can quickly and efficiently (e.g., at video rate or faster, in real or near real time) generate phase holograms (e.g., 3-D phase-only holograms) that can represent an object scene (e.g., 3-D object scene) that can have favorable quality. The hologram processor component can downsample the intensity distribution of an object scene using a uniform or random lattice prior to the hologram generation process. Due in part to the sparseness of the downsampled intensity distribution, the disclosed subject matter can attain a relatively good reconstruction of the original object scene with the phase component of the hologram alone (e.g., after generating a complex hologram based on the downsampled intensity distribution and converting the complex hologram to a phase-only hologram). As the downsampling process of the disclosed subject matter is almost computationally free, the time taken to derive the hologram (e.g., phase only hologram) can be substantially dependent on the hologram generation algorithm, wherein the disclosed subject matter can generate the phase hologram, based in part on a fast generation algorithm disclosed herein, at video rate or faster, in real or near real time.

Figure 6:
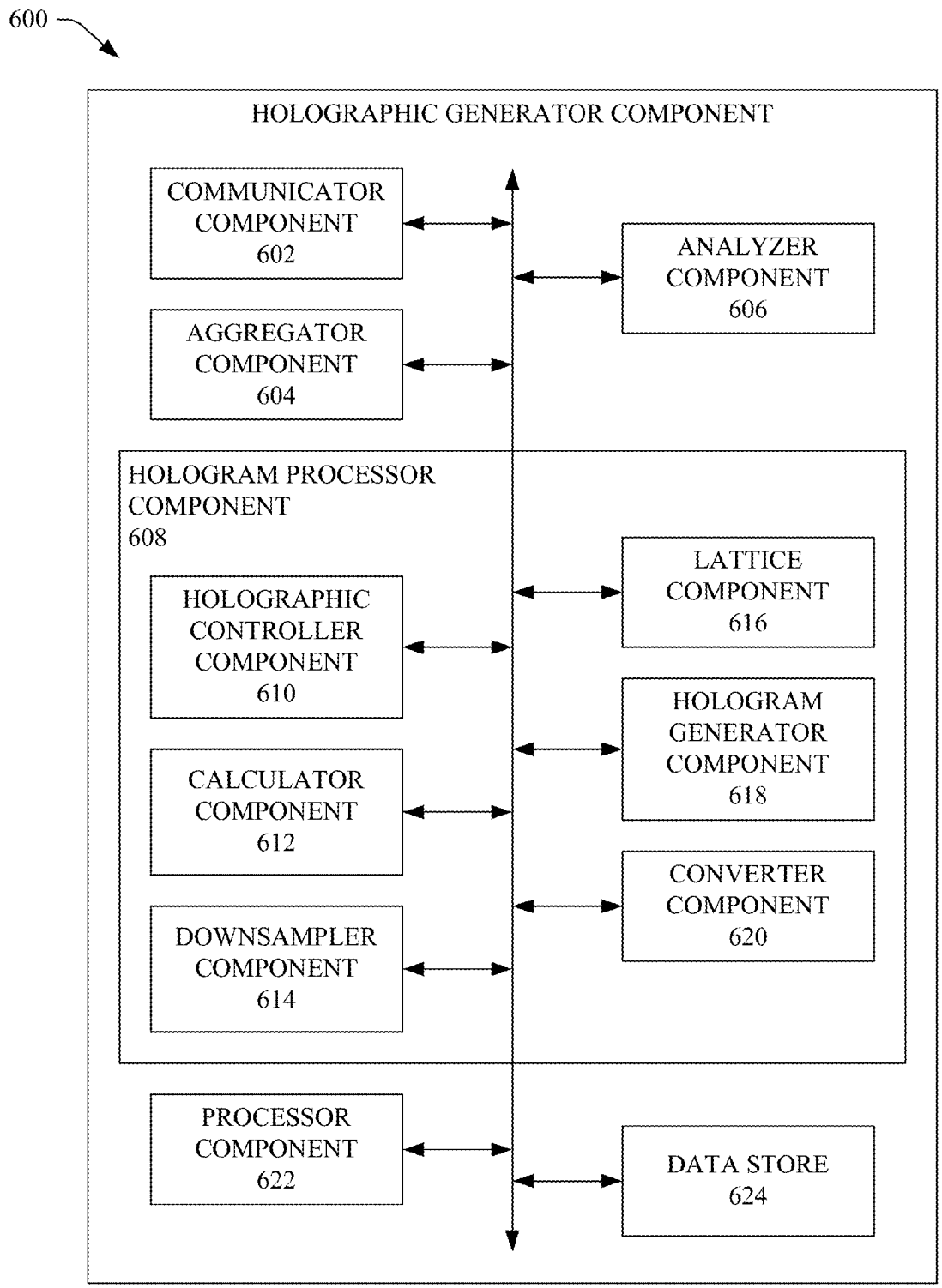
FIG. 6 illustrates a block diagram of an example holographic generator component that can efficiently generate a 3-D phase hologram(s) that can represent a real or synthetic 3-D object scene(s), in accordance with various aspects and implementations of the disclosed subject matter.

FIG. 6 illustrates a block diagram of an example HGC 600 that can efficiently generate (e.g., at video rate or faster, in real or at least near real time) a 3-D phase hologram(s) (e.g., a full-parallax 3-D phase hologram(s)) that can represent a real or synthetic 3-D object scene(s), in accordance with various aspects and implementations of the disclosed subject matter. The HGC 600 can include a communicator component 602 that can be used to communicate (e.g., transmit, receive) information between the HGC 600 and other components (e.g., display component(s), scene capture device(s), processor component(s), user interface(s), data store(s), etc.). The information can include, for example, a real or synthetic 3-D object scene, holograms or holographic images, information relating defined hologram generation criterion(s), information relation to an algorithm(s) (e.g., a downsampling algorithm (e.g., a downsampling algorithm based in part on a uniform lattice, a downsampling algorithm that is based in part on stochastic downsampling, etc.), hologram generation algorithm (e.g., fast hologram generation algorithm), etc.) that can facilitate generation of holograms or holographic images, etc.

The HGC 600 can comprise an aggregator component 604 that can aggregate data received (e.g., obtained) from various entities (e.g., scene capture device(s), display component(s), processor component(s), user interface(s), data store(s), etc.). The aggregator component 604 can correlate respective items of data based at least in part on type of data, source of the data, time or date the data was generated or received, object point with which data is associated, image with which data is associated, pixel with which a transparency level is associated, visual perspective with which data is associated, etc., to facilitate processing of the data (e.g., analyzing of the data by the analyzer component 606).

The analyzer component 606 can analyze data to facilitate downsampling a visual image of an object scene to a sparse, downsampled visual image, generating a complex hologram based in part on the sparse, downsampled visual image, converting complex values of members (e.g., pixels) in a complex hologram to phase values (e.g., phase-only or phase-specific values), generating a phase hologram (e.g., a POH, phase-specific hologram, or pure phase hologram) associated with an object scene (e.g., 3-D object scene) based at least in part on the complex hologram, and/or identifying elements (e.g., object points, features, etc.) of a 3-D object scene to facilitate generating a hologram (e.g., phase hologram), etc., and can generate analysis results, based at least in part on the data analysis. Based at least in part on the results of this analysis, the HGC 600 (e.g., using the hologram processor component 608) can downsample a visual image of an object scene to generate a sparse, downsampled visual image, generate a complex hologram based in part on the sparse, downsampled visual image, convert complex values of members in a complex hologram to phase values, generate a phase hologram associated with an object scene based at least in part on the complex hologram, and/or identify elements (e.g., object points, features, etc.) of a 3-D object scene to facilitate generating a hologram, or perform other processes on data relating to holograms.

The HGC 600 can include the hologram processor component 608 that can process visual images of an object scene to downsample the visual images to create corresponding sparse, downsampled visual images, generate a complex hologram based at least in part on a sparse, downsampled visual image, and/or converting a complex hologram to a phase hologram that can be displayed using a display component, comprising, for example, a phase-only display device. In accordance with various aspects and embodiments, based at least in part on the analysis results, the hologram processor component 608 can downsample a visual image of an object scene to create a sparse, downsampled visual image, generate a complex hologram based at least in part on the sparse, downsampled visual image, convert complex values of members (e.g., pixels) in a complex hologram to phase values (e.g., phase-only or phase-specific values), generate a phase hologram associated with an object scene based at least in part on the complex hologram, identify elements (e.g., object points, features, etc.) of a 3-D object scene to facilitate generating a hologram (e.g., phase hologram), or perform other processes on data relating to holograms. In some implementations, the hologram processor component 608 can comprise, for example, a holographic controller component 610, a calculator component 612, a downsampler component 614, a lattice component 616, a hologram generator component 618, and a converter component 620.

The holographic controller component 610 can control operations relating to processing visual images to generate corresponding sparse, downsampled visual images, generate a complex hologram (e.g., a full-parallax complex 3-D Fresnel hologram) based at least in part on a sparse, downsampled visual image, generate a phase hologram based at least in part on the complex hologram, and/or generate corresponding reconstructed holographic images based at least in part on the phase hologram. The holographic controller component 610 can facilitate controlling operations being performed by various components of the hologram processor component 608, controlling data flow between various components of the hologram processor component 608, controlling data flow between the hologram processor component 608 and other components of the HGC 600, etc.

The calculator component 612 can perform calculations on data (e.g., data with respective values), in accordance with various equations (e.g., mathematical expressions), to facilitate downsampling a visual image to create a corresponding sparse, downsampled visual image, generate a complex hologram based at least in part on the sparse, downsampled visual image, generate a phase hologram based at least in part on a complex hologram, convert a complex value of a member of a complex hologram to a phase value, etc. The calculator component 612 can facilitate calculating, for example, results for one or more equations relating to generating or processing phase holograms, including the various equations (e.g., Equations (1) through (10)) disclosed herein.

The downsampler component 614 can downsample visual images of an object scene (e.g., 3-D visual images, which can be a set of 2-D visual images of an object scene from various visual perspectives) to generate corresponding sparse, downsampled visual images using a desired downsampling process or algorithm based at least in part on a desired downsampling factor and using a desired downsampling lattice (e.g., a uniform grid-cross lattice or a random lattice). In some implementations, the downsampler component 614 can downsample the intensity profile $I(u,v)$ (e.g., intensity distribution) of object points of a visual image with a uniform grid-cross lattice, based at least in part on a desired downsampling factor, to facilitate converting the intensity profile $I(u,v)$ of the object points of the visual image into a texture of horizontal, vertical, and diagonal lines to create a sparse, downsampled visual image. In other implementations, the downsampler component 614 can employ stochastic downsampling on the intensity distribution $I(u,v)$ of object points of a visual image to facilitate downsampling the intensity distribution $I(u,v)$ of the object points of the visual image using a non-uniform or random lattice to generate a sparse intensity distribution $I_D(u,v)$ of object points of the visual image thereby creating a sparse, downsampled visual image.

The lattice component 616 can comprise various types of lattices that can be employed to facilitate downsampling visual images to generate sparse images based at least in part on a desired defined downsampling factor. In accordance with various implementations, the lattice component 616 can comprise a uniform grid-cross lattice, or a non-uniform or random lattice.

The hologram generator component 618 can facilitate generating a complex hologram that can represent an object scene, based at least in part on a sparse image that can represent the object scene, at a desired rate (e.g., at video rate (e.g., approximately 30 frames per second) or a faster video rate), for example, using one or more of the fast hologram generation techniques, processes, or methods, as disclosed herein. The hologram generator component 618 also can facilitate processing a complex hologram to generate a phase hologram that can correspond to the complex hologram at a desired rate (e.g., at video rate (e.g., approximately 30 frames per second) or a faster video rate), wherein the phase hologram can comprise the parallax information (e.g., vertical parallax information and horizontal parallax information) and depth information associated with the original visual image(s).

The converter component 620 can convert the complex value of a member of a complex hologram to a phase value (e.g., a phase-only or phase-specific value) for respective members of the complex hologram to facilitate converting the complex hologram to a phase hologram. For instance, the converter component 620 can set or modify the magnitude of each member to a desired constant or homogeneous value (e.g., a value of unity, so that the magnitude component of the member can be transparent), which can facilitate removing the magnitude information, while preserving or maintaining the respective phase values (e.g., corresponding to respective phase angles) of respective members of the complex hologram for example, in accordance with Equation (2).

The HGC 600 also can comprise a processor component 622 that can operate in conjunction with the other components (e.g., communicator component 602, aggregator component 604, analyzer component 606, hologram processor component 608, etc.) to facilitate performing the various functions of the HGC 600. The processor component 622 can employ one or more processors (e.g., central processing units (CPUs), GPUs, FPGAs, etc.), microprocessors, or controllers that can process data, such as information (e.g., visual information) relating to an object scene (e.g., 3-D object scene), holographic data, data relating to parameters associated with the HGC 600 and associated components, etc., to facilitate downsampling visual images, generating holograms (e.g., full-parallax complex 3-D Fresnel hologram, phase hologram based on the complex hologram) and corresponding holographic images representative of a 3-D object scene, or performing other operations relating to generating holograms; and can control data flow between the HGC 600 and other components associated with the HGC 600.

In yet another aspect, the HGC 600 can contain a data store 624 that can store data structures (e.g., user data, metadata); code structure(s) (e.g., modules, objects, classes, procedures), commands, or instructions; information relating to object points; information relating to (e.g., representative of) an object scene; model data; holographic data; information relating to downsampling visual images, generating a hologram, converting a complex value of a member of a complex hologram to a phase value, etc.; parameter data; algorithms (e.g., algorithm(s) relating to fast generation of holograms at a desired rate (e.g., at video rate or faster); a downsampling algorithm (e.g., a downsampling algorithm based in part on a uniform lattice, a downsampling algorithm that is based in part on stochastic downsampling, etc.); algorithm(s) relating to converting a complex hologram to a phase hologram; etc.); criterion(s) relating to hologram generation; and so on. In an aspect, the processor component 622 can be functionally coupled (e.g., through a memory bus) to the data store 624 in order to store and retrieve information desired to operate and/or confer functionality, at least in part, to the communicator component 602, aggregator component 604, analyzer component 606, hologram processor component 608, etc., and/or substantially any other operational aspects of the HGC 600. It is to be appreciated and understood that the various components of the HGC 600 can communicate information between each other and/or between other components associated with the HGC 600 as desired to carry out operations of the HGC 600. It is to be further appreciated and understood that respective components (e.g., communicator component 602, aggregator component 604, analyzer component 606, hologram processor component 608, etc.) of the HGC 600 each can be a stand-alone unit, can be included within the HGC 600 (as depicted), can be incorporated within another component of the HGC 600 (e.g., hologram processor component 608) or a component separate from the HGC 600, and/or virtually any suitable combination thereof, as desired.

It is to be appreciated and understood that, in accordance with various other aspects and embodiments, the HGC 600 or components associated therewith can include or be associated with other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reference beam component (e.g., to apply a reference beam to a 3-D object scene and/or a 3-D hologram), a render component (e.g., to render or convert data, such as model data or diffraction pattern data, associated with the 3-D object scene into corresponding holographic data, which can be used to generate a hologram that is a reproduction of the 3-D object scene), a reflector component(s) (e.g., to reflect holographic images to facilitate display of the hologram), and/or display partitions (e.g., to partition a display into a desired number of partitions in order to show different views of the hologram), etc., that can be employed to facilitate generating a hologram and/or generating or displaying corresponding holographic images representing a 3-D object scene.

Figure 7:
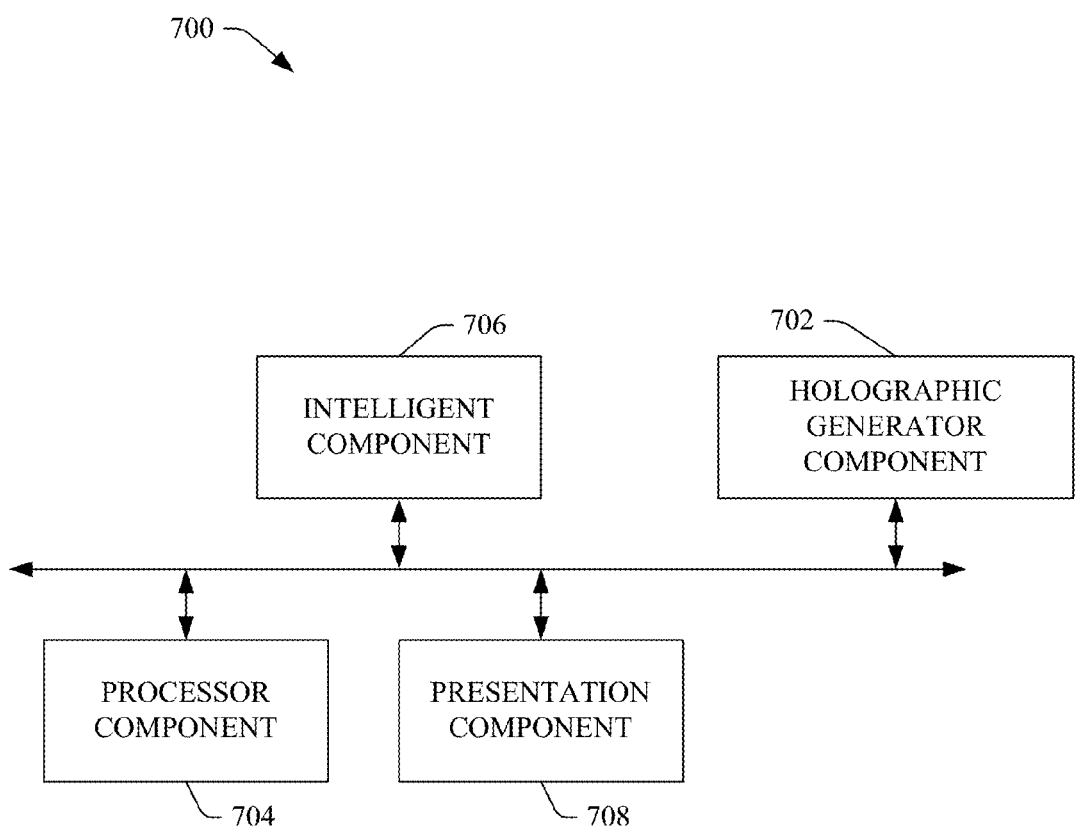
FIG. 7 depicts a system that can employ intelligence to facilitate generating phase holograms that can represent a real or synthetic 3-D object scene to a phase hologram to facilitate generating holographic images based at least in part on the phase holograms, in accordance with various aspects and embodiments of the disclosed subject matter.

Referring to FIG. 7, depicted is a block diagram of a system 700 that can employ intelligence to facilitate generating phase holograms that can represent a real or synthetic 3-D object scene to a phase hologram to facilitate generating holographic images based at least in part on the phase holograms, in accordance with various aspects and embodiments of the disclosed subject matter. The system 700 can include an HGC 702 that can desirably downsample visual images of 3-D object scene (e.g., a real or computer-synthesized 3-D object scene from multiple different viewing perspectives of a 3-D object scene that can correspond to multiple different viewing perspectives of the 3-D object scene), generate complex holograms based at least in part on the downsampled visual images, and convert complex holograms to phase holograms, as more fully disclosed herein. It is to be appreciated that the HGC 702 can be the same or similar as respective components (e.g., respectively named components), and/or can contain the same or similar functionality as respective components, as more fully described herein. The HGC 702 can include a hologram processor component (not shown in FIG. 7; e.g., as depicted in, or described herein in relation to FIG. 1) that can perform and/or control various operations to facilitate generating phase holograms that can represent an object scene, wherein reconstructed holographic images, which can be generated using the phase holograms, can be desirably displayed (e.g., with favorable or at least acceptable quality and resolution) on a display component (e.g., a phase-only display device, such as a phase-only SLM display device or a phase-only LCoS display device), as more fully disclosed herein.

The system 700 can further include a processor component 704 that can be associated with (e.g., communicatively connected to) the HGC 702 and/or other components (e.g., components of system 700) via a bus. In accordance with an embodiment of the disclosed subject matter, the processor component 704 can be an applications processor(s) that can manage communications and run applications. For example, the processor component 704 can be a processor that can be utilized by a computer, mobile computing device, personal data assistant (PDA), or other electronic computing device. The processor component 704 can generate commands in order to facilitate downsampling visual images of an object scene, generating complex holograms based at least in part on the downsampled visual images, converting complex holograms to phase holograms, and/or displaying of holographic images of a 3-D object scene from multiple different viewing perspectives corresponding to the multiple different viewing perspectives of the 3-D object scene obtained or created by the HGC 702, modifying parameters associated with the HGC 702, etc.

The system 700 also can include an intelligent component 706 that can be associated with (e.g., communicatively connected to) the HGC 702, the processor component 704, and/or other components associated with system 700 to facilitate analyzing data, such as current and/or historical information, and, based at least in part on such information, can make an inference(s) and/or a determination(s) regarding, for example, a downsampling process or algorithm to use to downsample visual images, downsample of visual images of an object scene, a fast hologram generation algorithm to use to generate complex holograms, generation of complex holograms based at least in part on the downsampled visual images, and/or conversion of complex holograms to phase holograms, to facilitate generating 3-D holograms (e.g., phase holograms that can based at least in part on the visual images of a 3-D object scene), generating corresponding 3-D holographic images that can represent a 3-D object scene, determining and/or setting of parameters associated with the HGC 702 and associated components, etc.

For example, based in part on current and/or historical evidence, the intelligent component 706 can infer or determine a downsampling process or algorithm to use to downsample visual images, a fast hologram generation algorithm to use to generate complex holograms, a value (e.g., constant magnitude value) to apply to a pixel to facilitate converting the complex value of a complex hologram to a phase value to facilitate generating a phase hologram, respective parameter values of one or more parameters to be used with regard to the performing of operations by the HGC 702, etc.

In an aspect, the intelligent component 706 can communicate information related to the inferences and/or determinations to the HGC 702. Based at least in part on the inference(s) or determination(s) made by the intelligent component 706, the HGC 702 can take (e.g., automatically or dynamically take) one or more actions to facilitate generating a 3-D hologram and/or a 3-D holographic image of a 3-D object scene from multiple different viewing perspectives corresponding to the multiple different viewing perspectives of a 3-D object scene obtained or generated by the HGC 702. For instance, the HGC 702 can determine, identify, and/or select a downsampling process or algorithm to use to downsample visual images, a fast hologram generation algorithm to use to generate complex holograms, a value (e.g., constant magnitude value) to apply to a pixel to facilitate converting the complex value of a complex hologram to a phase value to facilitate generating a phase hologram, respective parameter values of one or more parameters to be used with regard to the performing of operations by the HGC 702, etc., to facilitate generating 3-D holograms (e.g., 3-D phase holograms) and/or corresponding 3-D holographic images of a 3-D object scene, as disclosed herein.

It is to be understood that the intelligent component 706 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 700 also can include a presentation component 708, which can be connected with the processor component 704. The presentation component 708 can provide various types of user interfaces to facilitate interaction between a user and any component coupled to the processor component 704. As depicted, the presentation component 708 is a separate entity that can be utilized with the processor component 704 and associated components. However, it is to be appreciated that the presentation component 708 and/or similar view components can be incorporated into the processor component 704 and/or can be a stand-alone unit. The presentation component 708 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 704.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the HGC 702 and/or other components, can be situated or implemented on a single integrated-circuit chip. In accordance with another embodiment, the HGC 702, and/or other components, can be implemented on an application-specific integrated-circuit (ASIC) chip. In yet another embodiment, the HGC 702 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
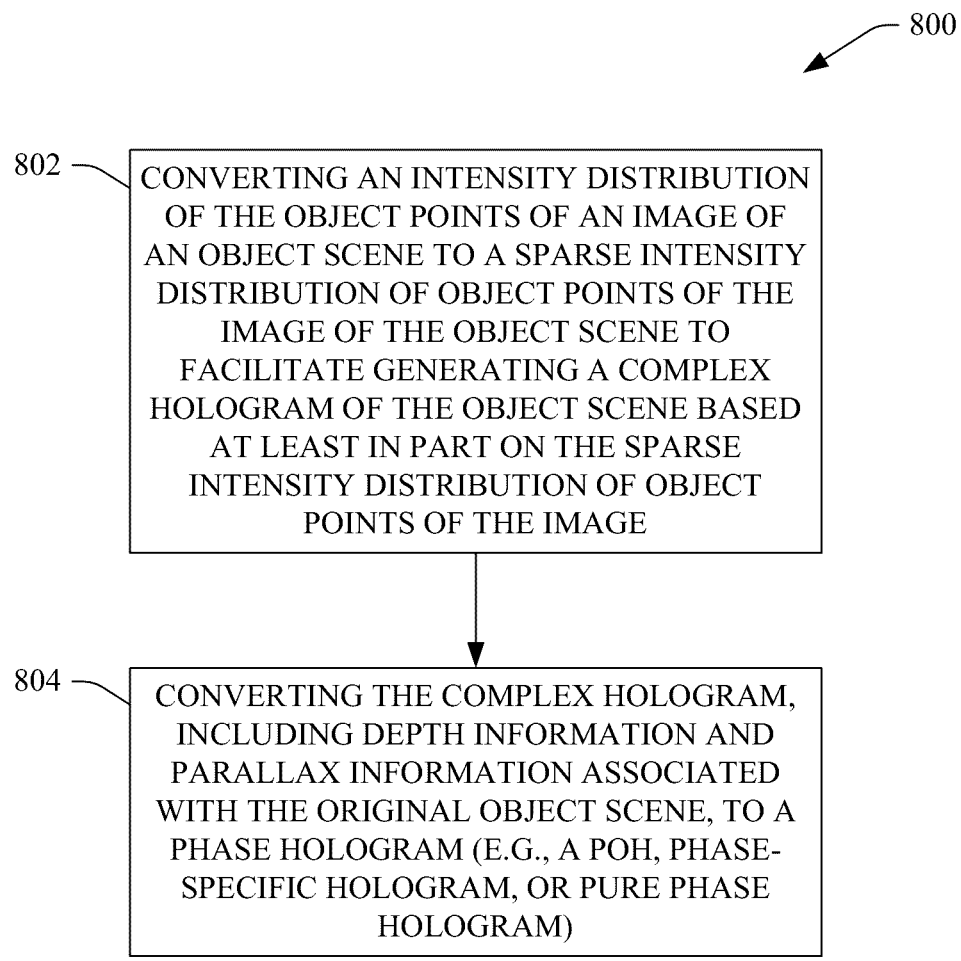
FIG. 8 illustrates a flow diagram of an example method that can efficiently and quickly generate a phase hologram(s) that can represent an object scene, in accordance with various aspects and embodiments of the disclosed subject matter.
Figure 9:
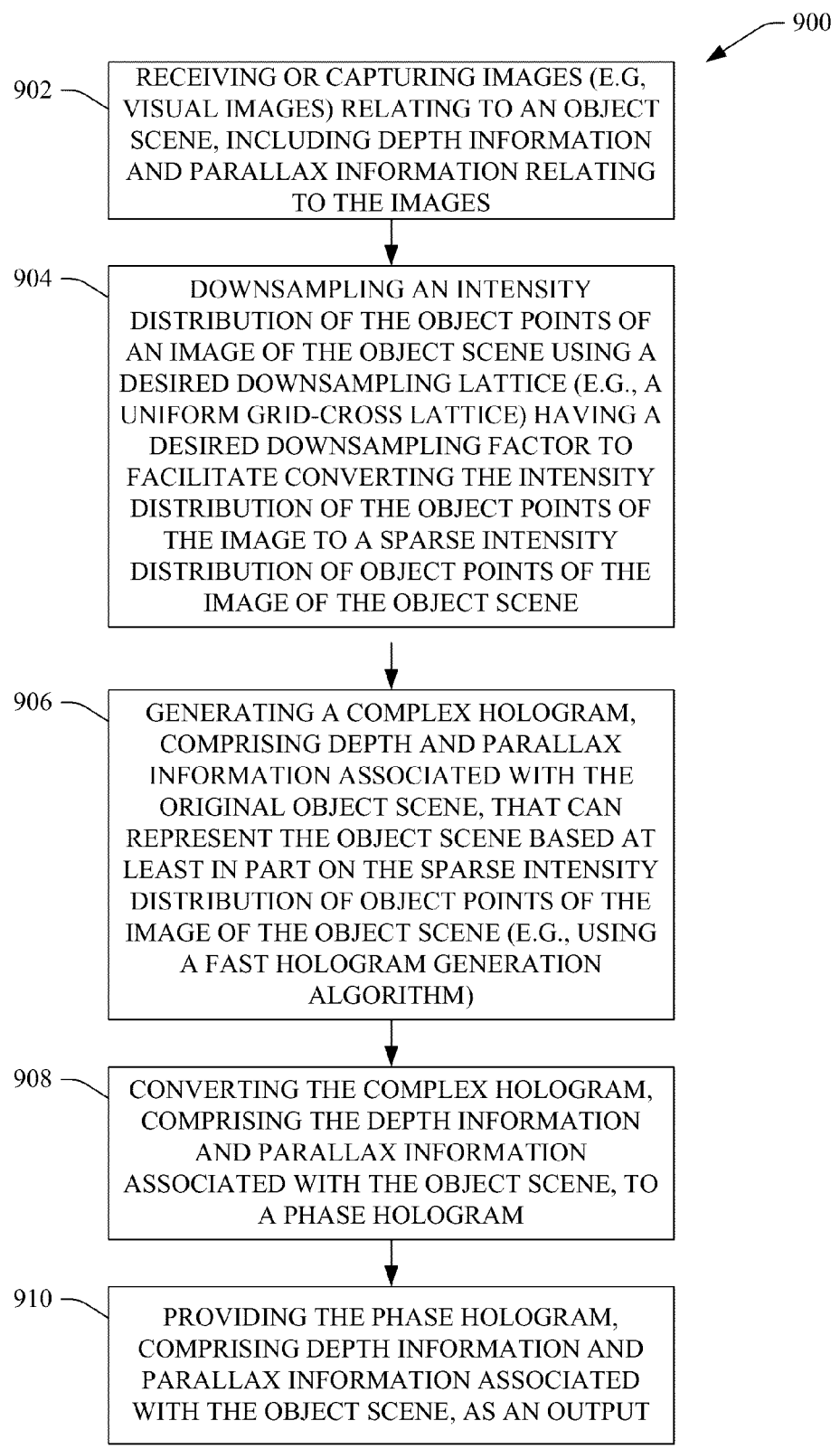
FIG. 9 depicts a flow diagram of an example method that can efficiently and quickly generate a phase hologram(s) that can be based at least in part on a desired downsampling lattice (e.g., a uniform grid-cross lattice), in accordance with various aspects and embodiments of the disclosed subject matter.
Figure 10:
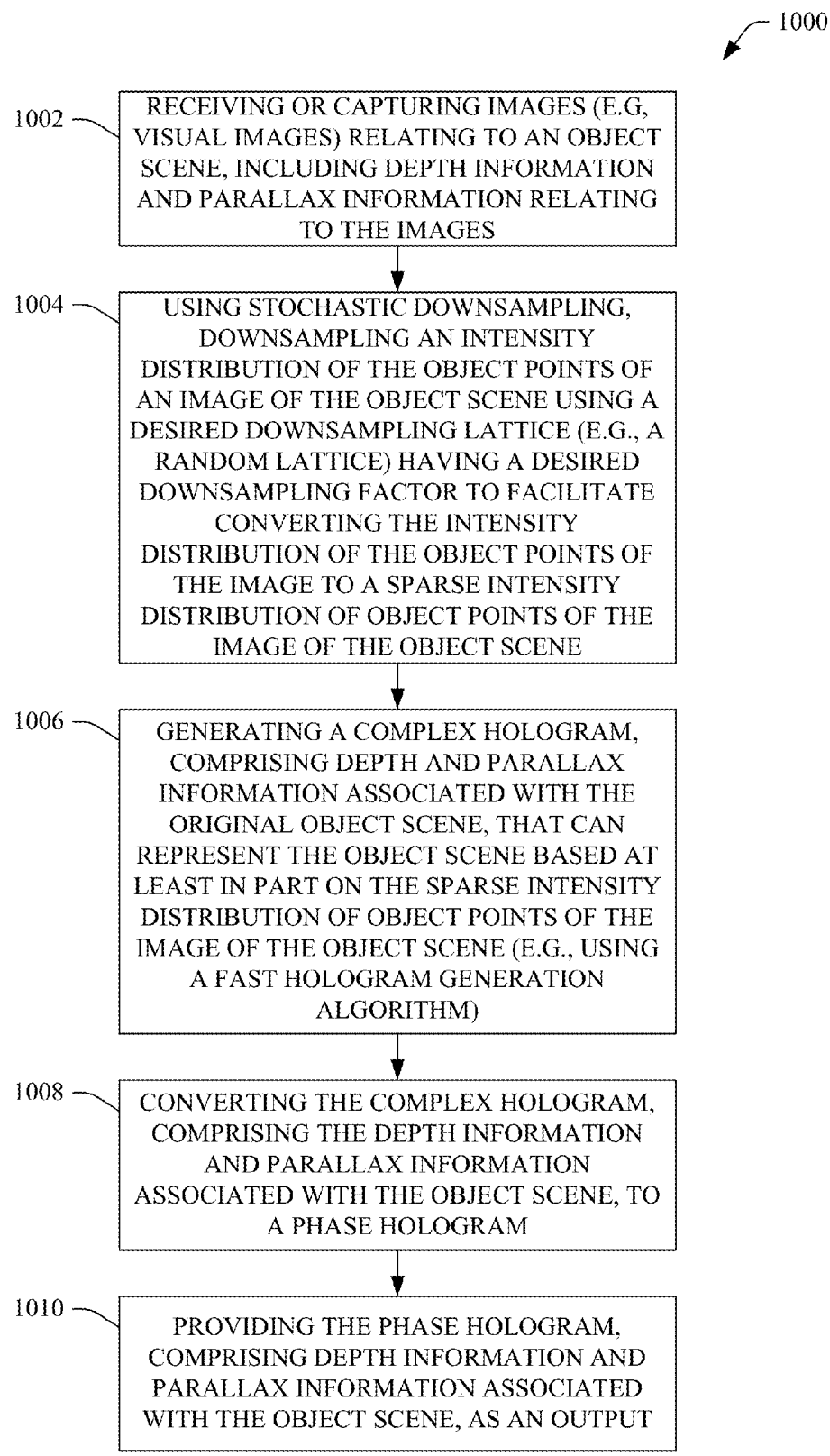
FIG. 10 presents a flow diagram of an example method that can efficiently and quickly convert a complex 3-D hologram(s) of a real or synthetic 3-D object scene(s) to generate a 3-D phase hologram(s) that can be based at least in part on stochastic downsampling using a desired downsampling lattice, in accordance with various aspects and embodiments of the disclosed subject matter.

FIGS. 8-10 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 8, illustrated is a flow diagram of an example method 800 that can efficiently and quickly (e.g., at video rate or faster, in real time or at least near real time) generate a phase hologram(s) (e.g., a 3-D phase hologram) that can represent an object scene (e.g., 3-D object scene), in accordance with various aspects and embodiments of the disclosed subject matter. The method 800 can be implemented by an HGC comprising a hologram processor component.

At 802, an intensity distribution of the object points of an image of an object scene can be converted to a sparse intensity distribution of object points of the image of the object scene to facilitate generating a complex hologram (e.g., a complex 3-D Fresnel hologram) of the object scene (e.g., a 3-D object scene) based at least in part on the sparse intensity distribution of object points of the image. The hologram processor component can convert the intensity distribution of the object points of the image to a sparse intensity distribution of object points of the image of the object scene, wherein the sparse intensity distribution can be more sparse (e.g., less dense) than the original intensity distribution of the object points of the image of the object scene. In some implementations, the hologram processor component can facilitate converting the intensity distribution of the object points of the image to a sparse intensity distribution of object points of the image by downsampling the original intensity distribution of object points by a desired downsampling factor (e.g., using a desired downsampling lattice or uniform grid-cross lattice). The hologram processor component can facilitate generating a complex hologram of the object scene based at least in part on the sparse intensity distribution of object points of the image of the object scene. The complex hologram can represent the original object scene from various visual perspectives (e.g., various viewing angles).

At 804, the complex hologram, including depth information and parallax information associated with the original object scene, can be converted to a phase hologram (e.g., a POH, phase-specific hologram, or pure phase hologram). The hologram processor component can facilitate converting the complex hologram, which can be based at least in part on the sparse intensity distribution of object points of the image, to a phase hologram. In some implementations, the hologram processor component can set or modify the magnitude of each pixel of the complex hologram to a defined magnitude value (e.g., to a unity value), while maintaining the phase value of each pixel, to facilitate converting the complex hologram to a phase hologram. A display component, which can include one or more display units that can be a phase-only display device (e.g., a phase-only SLM display device or a phase-only LCoS display device), can be employed to display holographic images based at least in part on the phase hologram. The phase hologram can represent the original object scene from various visual perspectives (e.g., various viewing angles) that can correspond to the various visual perspectives associated with the complex hologram.

Turning to FIG. 9, depicted is a flow diagram of an example method 900 that can efficiently and quickly (e.g., at video rate or faster, in real time or at least near real time) generate a phase hologram(s) that can be based at least in part on a desired downsampling lattice (e.g., a uniform grid-cross lattice), in accordance with various aspects and embodiments of the disclosed subject matter. The method 900 can be implemented by an HGC comprising a hologram processor component, a display component, and/or another component.

At 902, images (e.g., visual images) relating to an object scene, including depth information and parallax information relating to the images, can be received or captured. The HGC can receive or capture the visual images relating to the object scene (e.g., 3-D object scene). The images can represent the object scene from various visual perspectives (e.g., various visual angles). The object scene can be a real or synthetic object scene.

At 904, an intensity distribution of the object points of an image (e.g., a 3-D visual image) of the object scene (e.g., 3-D object scene) can be downsampled using a desired downsampling lattice (e.g., a uniform grid-cross lattice) having a desired downsampling factor to facilitate converting the intensity distribution of the object points of the image to a sparse intensity distribution of object points of the image of the object scene. The hologram processor component can downsample the intensity distribution of the object points of the image using a uniform grid-cross lattice having a desired downsampling factor to facilitate converting the intensity distribution of the object points of the image to the sparse intensity distribution of object points of the image. The sparse intensity distribution can be more sparse (e.g., less dense) than the original intensity distribution of the object points of the image of the object scene, wherein the sparseness of the sparse intensity distribution relative to the original intensity distribution can be based at least in part on the downsampling factor.

At 906, a complex hologram, comprising depth and parallax information associated with the original object scene, that can represent the object scene can be generated (e.g., in real or near real time) based at least in part on the sparse intensity distribution of object points of the image of the object scene (e.g., using a fast hologram generation algorithm, such as disclosed herein). The hologram processor component can generate (e.g., in real or near real time) the complex hologram, comprising the depth information and parallax (e.g., vertical and horizontal parallax) information associated with the original object scene, that can represent the object scene based at least in part on the sparse intensity distribution of object points of the image of the object scene. In some implementations, the hologram processor component can generate the complex hologram using a fast hologram generation algorithm, such as disclosed herein.

At 908, the complex hologram, comprising the depth information and parallax information associated with the object scene, can be converted to a phase hologram. The hologram processor component can facilitate converting the complex hologram, which can be based at least in part on the sparse intensity distribution of object points of the image, to a phase hologram (e.g., a POH, phase-specific hologram, or pure phase hologram). In some implementations, the hologram processor component can set or modify the magnitude of each pixel of the complex hologram to a defined magnitude value (e.g., to a unity value), while maintaining the phase value of each pixel, to facilitate converting the complex hologram to the phase hologram.

At 910, the phase hologram, comprising depth information and parallax information associated with the object scene, can be provided as an output. The HGC can facilitate providing the phase hologram of the object scene as an output. A display component, which can include one or more display units that can be a phase-only display device (e.g., a phase-only SLM display device or a phase-only LCoS display device), can be employed to display holographic images that can be generated or reconstructed based at least in part on the phase hologram. The phase hologram can represent the original object scene from various visual perspectives (e.g., various viewing angles) that can correspond to the various visual perspectives associated with the complex hologram, and can comprise depth information and parallax information associated with the object scene.

FIG. 10 presents a flow diagram of an example method 1000 that can efficiently and quickly (e.g., at video rate or faster, in real time or at least near real time) convert a complex 3-D hologram(s) (e.g., a complex full-parallax 3-D Fresnel hologram(s)) of a real or synthetic 3-D object scene(s) to generate a 3-D phase hologram(s) (e.g., a full-parallax 3-D phase hologram(s)) that can be based at least in part on stochastic downsampling using a desired downsampling lattice, in accordance with various aspects and embodiments of the disclosed subject matter. The method 1000 can be implemented by an HGC comprising a hologram processor component, a display component, and/or another component.

At 1002, images (e.g., visual images) relating to an object scene, including depth information and parallax information relating to the images, can be received or captured. The HGC can receive or capture the visual images relating to the object scene (e.g., 3-D object scene) and depth information and parallax information relating to the visual images. The visual images can represent the object scene from various visual perspectives (e.g., various visual angles). The object scene can be a real or synthetic object scene.

At 1004, an intensity distribution of the object points of an image (e.g., a 3-D visual image) of the object scene (e.g., 3-D object scene) can be downsampled using stochastic downsampling having a desired downsampling factor (e.g., based at least in part on a desired downsampling lattice, such as a non-uniform or random lattice) to facilitate converting the intensity distribution of the object points of the image to a sparse intensity distribution of object points of the image of the object scene. The hologram processor component can downsample (e.g., using stochastic downsampling) the intensity distribution of the object points of the image using a downsampling lattice having a desired downsampling factor to facilitate converting the intensity distribution of the object points of the image to the sparse intensity distribution of object points of the image. The sparse intensity distribution can be more sparse (e.g., less dense) than the original intensity distribution of the object points of the image of the object scene, wherein the sparseness of the sparse intensity distribution relative to the original intensity distribution can be based at least in part on the downsampling factor. The sparse image associated with the sparse intensity distribution of object points of the image of the object scene can comprise the parallax information (e.g., vertical and horizontal parallax information) and depth information associated with the visual image and original object scene.

At 1006, a complex hologram, comprising depth and parallax information associated with the original object scene, that can represent the object scene can be generated (e.g., in real or near real time) based at least in part on the sparse intensity distribution of object points of the image of the object scene (e.g., using a fast hologram generation algorithm, such as disclosed herein). The hologram processor component can generate (e.g., in real or near real time) the complex hologram, comprising the depth information and parallax (e.g., vertical and horizontal parallax) information associated with the original object scene, that can represent the object scene based at least in part on the sparse intensity distribution of object points of the image of the object scene. In some implementations, the hologram processor component can generate the complex hologram using a fast hologram generation algorithm, such as disclosed herein.

At 1008, the complex hologram, comprising the depth information and parallax information associated with the object scene, associated with the image can be converted to a phase hologram. The hologram processor component can facilitate converting the complex hologram, which can be based at least in part on the sparse intensity distribution of object points of the image, to a phase hologram (e.g., a POH, phase-specific hologram, or pure phase hologram). In some implementations, the hologram processor component can set or modify the magnitude of each pixel of the complex hologram to a defined magnitude value (e.g., to a unity value), while maintaining the phase value of each pixel, to facilitate converting the complex hologram to the phase hologram.

At 1010, the phase hologram, comprising depth information and parallax information associated with the object scene, can be provided as an output. The HGC can facilitate providing the phase hologram of the object scene as an output. A display component, which can include one or more display units that can be a phase-only display device (e.g., a phase-only SLM display device or a phase-only LCoS display device), can be employed to display holographic images that can be generated or reconstructed based at least in part on the phase hologram. The phase hologram can represent the original object scene from various visual perspectives (e.g., various viewing angles) that can correspond to the various visual perspectives associated with the complex hologram, and can comprise depth information and parallax information associated with the object scene.

Figure 11:
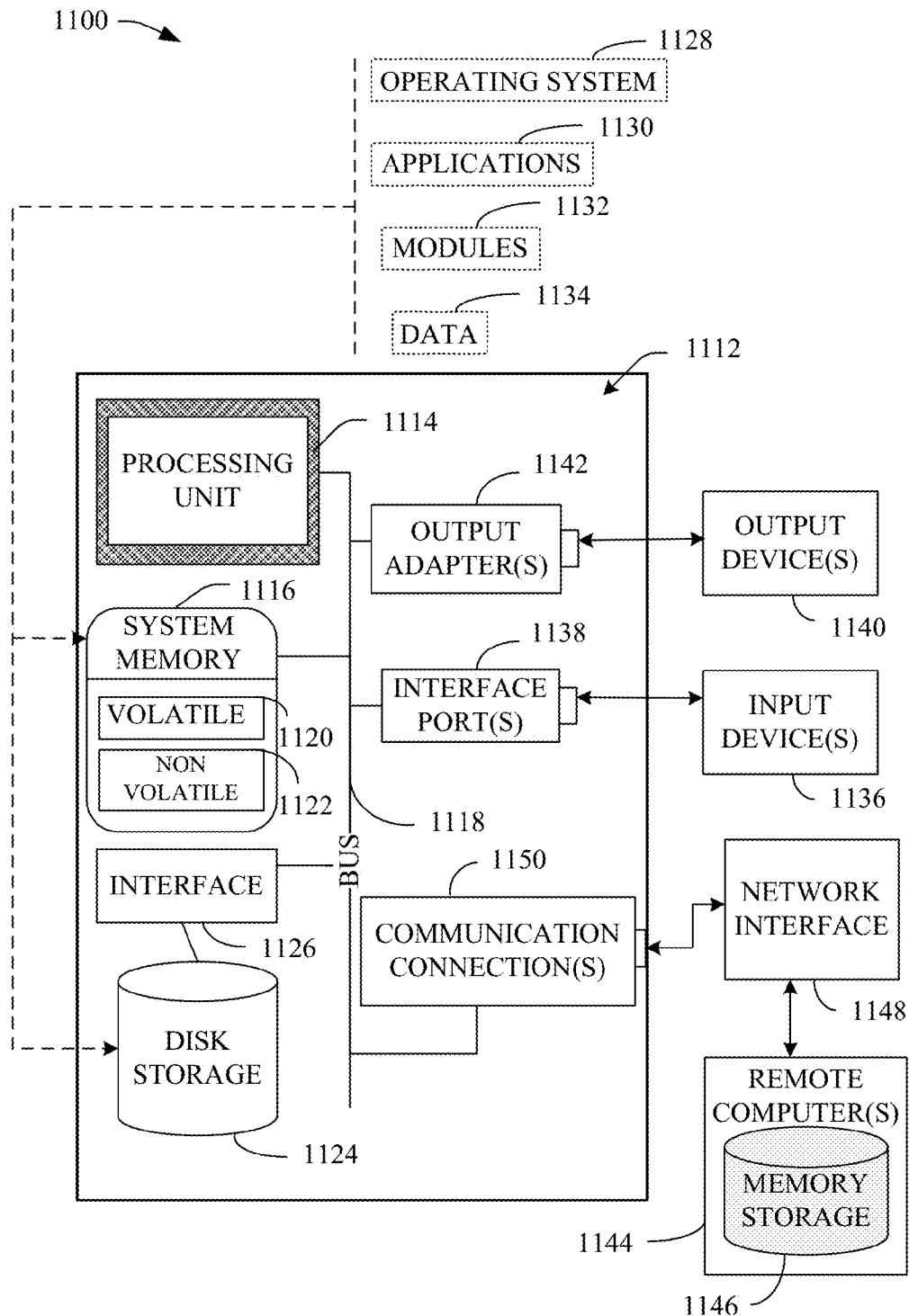
FIG. 11 is a schematic block diagram illustrating a suitable operating environment.
Figure 12:
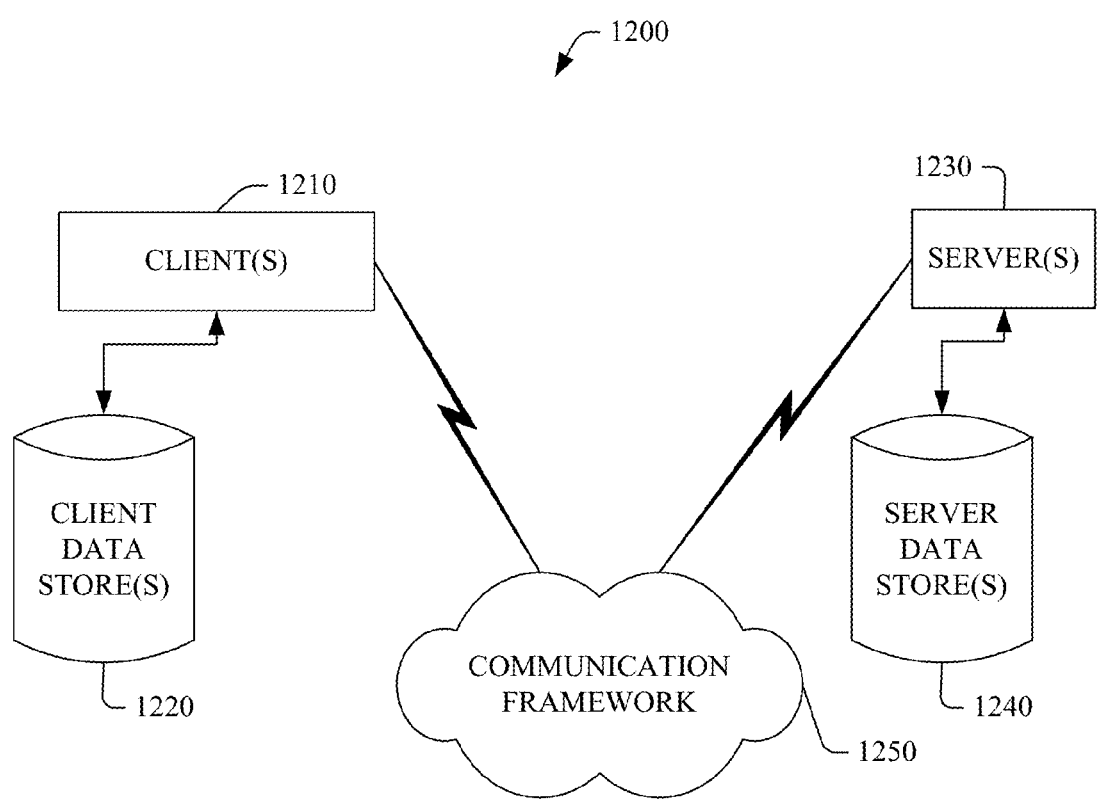
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 11, a suitable environment 1100 for implementing various aspects of the claimed subject matter includes a computer 1112. The computer 1112 includes a processing unit 1114, a system memory 1116, and a system bus 1118. It is to be appreciated that the computer 1112 can be used in connection with implementing one or more of the systems or components (e.g., HGC, hologram processor component, display component, processor component, data store, etc.) shown and/or described in connection with, for example, FIGS. 1-10. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also can include removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126).

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the subject disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be appreciated and understood that components (e.g., holographic generator component, hologram processor component, display component, processor component, data store, etc.), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). As used and defined herein, the term "computer-readable storage device" excludes transitory storage media. Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
at least one memory that stores computer-executable components; and
at least one processor that executes or facilitates execution of the computer executable components, comprising:
a holographic generator component that receives or generates a visual image that represents an object scene; and
a hologram processor component that converts the visual image to a sparse image to facilitate generating a complex hologram of the object scene based at least in part on the sparse image, and converts the complex hologram to a phase hologram to facilitate generation of a holographic image that represents the object scene based at least in part on the phase hologram, wherein the complex hologram comprises a magnitude portion and a phase portion, and the phase hologram comprises the phase portion, wherein the sparse image has a visual characteristic that is less dense than the visual image, and wherein, to facilitate the visual image being converted to the sparse image, the hologram processor component downsamples an intensity distribution of object points of the visual image by a defined downsampling factor, based at least in part on a lattice component, to generate a sparse intensity distribution of the object points of the visual image.

2. The system of claim 1, wherein the hologram processor component uses stochastic downsampling that comprises multiplying the intensity distribution of the object points of the visual image with a downsampling lattice that employs a random value to facilitate generating the sparse intensity distribution of the object points of the visual image.

3. The system of claim 1, wherein the sparse intensity distribution of the object points of the visual image is less dense than the intensity distribution of the object points of the visual image.

4. The system of claim 1, wherein the lattice component comprises a uniform grid-cross lattice.

5. The system of claim 1, wherein the lattice component comprises a random lattice, and the hologram processor component uses stochastic downsampling to downsample the intensity distribution of the object points of the visual image by the defined downsampling factor, based at least in part on the random lattice, to generate the sparse intensity distribution of the object points of the visual image.

6. The system of claim 1, wherein the phase hologram comprises parallax information and depth information associated with the object scene.

7. The system of claim 6, wherein the parallax information comprises vertical parallax information and horizontal parallax information associated with the object scene.

8. The system of claim 1, wherein the hologram processor component generates complex holograms, comprising the complex hologram, of visual images, comprising the visual image, of the object scene, based at least in part on a hologram generation algorithm, at a defined rate of frames per second.

9. The system of claim 1, wherein the complex hologram comprises a set of pixels, and wherein the hologram processor component, for the magnitude portion, sets respective magnitude values of respective pixels of the set of pixels to a defined magnitude value and, for the phase portion, maintains the respective phase values of the respective pixels to facilitate the conversion of the complex hologram to the phase hologram.

10. The system of claim 1, wherein the phase hologram is a phase-only hologram that has the phase portion and does not have the magnitude portion.

11. The system of claim 1, wherein the computer-executable components further comprise a display component that facilitates display of a holographic image based at least in part on the phase hologram.

12. The system of claim 11, wherein the display component comprises a phase-only display device.

13. The system of claim 12, wherein the display component comprises at least one of a phase-only spatial light modulator display device, a phase-only liquid crystal on silicon display device, or a phase-only liquid crystal display device.

14. The system of claim 1, wherein the object scene is a real or synthesized three-dimensional object scene, the complex hologram is a full-parallax three-dimensional hologram that represents the real or synthesized three-dimensional object scene, and the holographic image is a three-dimensional full-parallax holographic image based at least in part on the phase hologram.

* * * * *